(12) United States Patent
Rafii et al.

(10) Patent No.: US 6,614,422 B1
(45) Date of Patent: Sep. 2, 2003

(54) METHOD AND APPARATUS FOR ENTERING DATA USING A VIRTUAL INPUT DEVICE

(75) Inventors: Abbas Rafii, Los Altos, CA (US); Cyrus Bamji, Fremont, CA (US); Nazim Kareemi, Palo Alto, CA (US); Shiraz Shivji, Saratoga, CA (US)

(73) Assignee: Canesta, Inc., San Jose, CA (US)

( * ) Notice: Subject to any disclaimer, the term of this patent is extended or adjusted under 35 U.S.C. 154(b) by 0 days.

(21) Appl. No.: 09/502,499

(22) Filed: Feb. 11, 2000

Related U.S. Application Data
(60) Provisional application No. 60/163,445, filed on Nov. 4, 1999.

(51) Int. Cl.$^7$ ................................................ G09G 5/00
(52) U.S. Cl. ...................... 345/168; 345/156; 345/158; 345/169; 345/173
(58) Field of Search ................................ 345/156, 168, 345/169, 170, 173, 158; 382/48; 364/188

(56) References Cited

U.S. PATENT DOCUMENTS

| | | | | |
|---|---|---|---|---|
| 5,168,531 A | * | 12/1992 | Sigel | 382/48 |
| 5,198,877 A | | 3/1993 | Schulz | |
| 5,617,312 A | * | 4/1997 | Iura et al. | 364/188 |
| 5,767,842 A | * | 6/1998 | Korth | 345/168 |
| 5,798,519 A | * | 8/1998 | Vock et al. | 250/206.1 |
| 5,969,698 A | * | 10/1999 | Richard et al. | 345/7 |
| 6,037,882 A | * | 3/2000 | Levy | 341/20 |
| 6,043,805 A | * | 3/2000 | Hsieh | 345/158 |
| 6,115,128 A | * | 9/2000 | Vann | 365/175 |
| 6,229,913 B1 | * | 5/2001 | Nayar et al. | 382/154 |
| 6,252,598 B1 | * | 6/2001 | Segen | 345/358 |
| 6,266,048 B1 | * | 7/2001 | Carau, Sr. | 345/168 |
| 6,281,878 B1 | * | 8/2001 | Montellese | 345/156 |
| 6,424,334 B1 | * | 7/2002 | Zimmerman et al. | 345/158 |
| 6,512,838 B1 | * | 1/2003 | Rafii et al. | 382/106 |

\* cited by examiner

Primary Examiner—Richard Hjerpe
Assistant Examiner—Alecia D. Nelson
(74) Attorney, Agent, or Firm—Dorsey & Whitney LLP

(57) ABSTRACT

A user inputs digital data to a companion system such as a PDA, a cell telephone, an applicance, device using a virtual input device such as an image of a keyboard. A sensor captures three-dimensional positional information as to location of the user's fingers in relation to where keys would be on an actual keyboard. This information is processed with respect to finger locations and velocities and shape to determine when virtual keys would have been struck. The processed digital information is output to the companion system. The companion system can display an image of a keyboard, including an image of a keyboard showing user fingers, and/or alphanumeric text as such data is input by the user on the virtual input device.

82 Claims, 11 Drawing Sheets

↑ FINGER TIPS

FIG. 7E

HIGH POINT

FIG. 7I
CONTACT

| d | d | d | d | 8 | 2 | 2 | 2 | 2 | d | 1 | 1 | 1 | 1 | 3 | 3 | 3 | 3 | 7 | 7 |
|---|---|---|---|---|---|---|---|---|---|---|---|---|---|---|---|---|---|---|---|
| d | d | d | 8 | 7 | 8 | 2 | | 2 | d | 1 | 1 | 1 | 1 | 2 | 2 | 2 | 2 | 5 | 5 |
| d | d | 7 | 7 | 7 | d | 3 | (2) | 3 | d | 1 | (3) | 1 | 1 | 2 | 2 | 2 | d | (5) | |
| d | d | (1) | | 8 | d | 3 | 3 | 3 | d | 1 | | 1 | 1 | 1 | (4) | 1 | 3 | | |
| d | 8 | 7 | 7 | 8 | d | 3 | 3 | 3 | d | 1 | 1 | 1 | 1 | 1 | | 1 | 2 | 2 | d |
| 7 | 7 | 7 | 7 | 7 | d | 4▼ | 4 | 4 | d | 1 | 1 | 1 | 1 | 1 | 1 | 1 | 1 | d | d |
| d | d | d | d | d | d | d | d | d | d | d | d | d | d | d | d | d | d | d | d |

FIG. 7N

| d | d | d | d | 8 | 2 | 2 | 2 | 2 | d | 1 | 1 | 1 | 1 | 3 | 3 | 3 | 3 | 7 | 7 |
|---|---|---|---|---|---|---|---|---|---|---|---|---|---|---|---|---|---|---|---|
| d | d | d | 8 | 7 | 2 | 2 | | 2 | d | 1 | 1 | 1 | 1 | 2 | 2 | 2 | 2 | 5 | 5 |
| d | d | 7 | 7 | 7 | 8 | 3 | (2) | 3 | d | 1 | (3) | 1 | 1 | 2 | 2 | 2 | d | (5) | |
| d | d | (1) | | 8 | d | 3 | 3 | 3 | d | 1 | | 1 | 1 | 1 | (4) | 1 | 3 | | |
| d | 8 | 7 | 7 | 8 | d | 3 | 3 | 3 | d | 1 | 1 | 1 | 1 | 1 | | 1 | 2 | 2 | d |
| 7 | 7 | 7 | 7 | 7 | d | 4 | 4 | 4 | d | 1 | 1 | 1 | 1 | 1 | 1 | 1 | 1 | d | d |
| d | d | d | d | d | d | 4▼ | 4 | 4 | d | d | d | d | d | d | d | d | d | d | d |

CONTACT (LOW POINT)

FIG. 7O

METHOD AND APPARATUS FOR ENTERING DATA USING A VIRTUAL INPUT DEVICE

RELATION TO PREVIOUSLY FILED APPLICATION

Priority is claimed from U.S. provisional patent application, Ser. No. 60/163,445, filed on Nov. 4, 1999 and entitled "Method and Device for 3D Sensing of Input Commands to Electronic Devices", in which applicants herein were applicants therein. Said provisional patent application, which was assigned to Canasta, Inc., assignee herein, is incorporated herein by reference. Reference is also made to applicant Cyrus Bamji's U.S. patent application Ser. No. 09/401,059 filed on Sep. 22, 1999, entitled "CMOS-COMPATIBLE THREE-DIMENSIONAL IMAGE SENSOR IC" and assigned to Canasta, Inc., the common assignee herein. Said U.S. patent application is also incorporated herein by reference.

FIELD OF THE INVENTION

The invention relates generally to inputting commands and/or data (collectively, referred to herein as "data") to electronic systems including computer systems. More specifically, the invention relates to methods and apparatuses for inputting data when the form factor of the computing device precludes using normally sized input devices such as a keyboard, or when the distance between the computing device and the input device makes it inconvenient to use a conventional input device coupled by cable to the computing device.

BACKGROUND OF THE INVENTION

Computer systems that receive and process input data are well known in the art. Typically such systems include a central processing unit (CPU), persistent read only memory (ROM), random access memory (RAM), at least one bus interconnecting the CPU, the memory, at least one input port to which a device is coupled input data and commands, and typically an output port to which a monitor is coupled to display results. Traditional techniques for inputting data have included use of a keyboard, mouse, joystick, remote control device, electronic pen, touch panel or pad or display screen, switches and knobs, and more recently handwriting recognition, and voice recognition.

Computer systems and computer-type systems have recently found their way into a new generation of electronic devices including interactive TV, set-top boxes, electronic cash registers, synthetic music generators, handheld portable devices including so-called personal digital assistants (PDA), and wireless telephones. Conventional input methods and devices are not always appropriate or convenient when used with such systems.

For example, some portable computer systems have shrunk to the point where the entire system can fit in a user's hand or pocket. To combat the difficulty in viewing a tiny display, it is possible to use a commercially available virtual display accessory that clips onto an eyeglass frame worn by the user of the system. The user looks into the accessory, which may be a 1" VGA display, and sees what appears to be a large display measuring perhaps 15" diagonally.

Studies have shown that use of a keyboard and/or mouse-like input device is perhaps the most efficient technique for entering or editing data in a companion computer or computer-like system. Unfortunately it has been more difficult to combat the problems associated with a smaller size input device, as smaller sized input devices can substantially slow the rate with which data can be entered. For example, some PDA systems have a keyboard that measures about 3"×7'. Although data and commands may be entered into the PDA via the keyboard, the entry speed is reduced and the discomfort level is increased, relative to having used a full sized keyboard measuring perhaps 6"×12'. Other PDA systems simply eliminate the keyboard and provide a touch screen upon which the user writes alphanumeric characters with a stylus. Handwriting recognition software within the PDA then attempts to interpret and recognize alphanumeric characters drawn by the user with a stylus on a touch sensitive screen. Some PDAs can display an image of a keyboard on a touch sensitive screen and permit users to enter data by touching the images of various keys with a stylus. In other systems, the distance between the user and the computer system may preclude a convenient use of wire-coupled input devices, for example the distance between a user and a set-top box in a living room environment precludes use of a wire-coupled mouse to navigate.

Another method of data and command input to electronic devices is recognizing visual images of user actions and gestures that are then interpreted and converted to commands for an accompanying computer system. One such approach was described in U.S. Pat. No. 5,767,842 to Korth (1998) entitled "Method and Device for Optical Input of Commands or Data". Korth proposed having a computer system user type on an imaginary or virtual keyboard, for example a keyboard-sized piece of paper bearing a template or a printed outline of keyboard keys. The template is used to guide the user's fingers in typing on the virtual keyboard keys. A conventional TV (two-dimensional) video camera focused upon the virtual keyboard was stated to somehow permit recognition of what virtual key (e.g., printed outline of a key) was being touched by the user's fingers at what time as the user "typed" upon the virtual keyboard.

But Korth's method is subject to inherent ambiguities arising from his reliance upon relative luminescence data, and indeed upon an adequate source of ambient lighting. While the video signal output by a conventional two-dimensional video camera is in a format that is appropriate for image recognition by a human eye, the signal output is not appropriate for computer recognition of viewed images. For example, in a Korth-type application, to track position of a user's fingers, computer-executable software must determine contour of each finger using changes in luminosity of pixels in the video camera output signal. Such tracking and contour determination is a difficult task to accomplish when the background color or lighting cannot be accurately controlled, and indeed may resemble the user's fingers. Further, each frame of video acquired by Korth, typically at least 100 pixels×100 pixels, only has a grey scale or color scale code (typically referred to as RGB). Limited as he is to such RGB value data, a microprocessor or signal processor in a Korth system at best might detect the contour of the fingers against the background image, if ambient lighting conditions are optimal.

The attendant problems are substantial as are the potential ambiguities in tracking the user's fingers. Ambiguities are inescapable with Korth's technique because traditional video cameras output two-dimensional image data, and do not provide unambiguous information about actual shape and distance of objects in a video scene. Indeed, from the vantage point of Korth's video camera, it would be very difficult to detect typing motions along the axis of the camera lens. Therefore, multiple cameras having different vantage points would be needed to adequately capture the complex keying motions. Also, as suggested by Korth's FIG. 1, it can be difficult merely to acquire an unobstructed view of each finger on a user's hands, e.g., acquiring an image of the right forefinger is precluded by the image-blocking presence of the right middle finger, and so forth. In short, even with good ambient lighting and a good vantage point for his camera, Korth's method still has many shortcomings, including ambiguity as to what row on a virtual keyboard a user's fingers is touching.

In an attempt to gain depth information, the Korth approach may be replicated using multiple two-dimensional video cameras, each aimed toward the subject of interest from a different viewing angle. Simple as this proposal sounds, it is not practical. The setup of the various cameras is cumbersome and potentially expensive as duplicate cameras are deployed. Each camera must be calibrated accurately relative to the object viewed, and relative to each other. To achieve adequate accuracy the stereo cameras would like have to be placed at the top left and right positions relative to the keyboard. Yet even with this configuration, the cameras would be plagued by fingers obstructing fingers within the view of at least one of the cameras. Further, the computation required to create three-dimensional information from the two-dimensional video image information output by the various cameras contributes to the processing overhead of the computer system used to process the image data. Understandably, using multiple cameras would substantially complicate Korth's signal processing requirements. Finally, it can be rather difficult to achieve the necessary camera-to-object distance resolution required to detect and recognize fine object movements such as a user's fingers while engaged in typing motion.

In short, it may not be realistic to use a Korth approach to examine two-dimensional luminosity-based video images of a user's hands engaged in typing, and accurately determine from the images what finger touched what key (virtual or otherwise) at what time. This shortcoming remains even when the acquired two-dimensional video information processing is augmented with computerized image pattern recognition as suggested by Korth. It is also seen that realistically Korth's technique does not lend itself to portability. For example, the image acquisition system and indeed an ambient light source will essentially be on at all times, and will consume sufficient operating power to preclude meaningful battery operation. Even if Korth could reduce or power down his frame rate of data acquisition to save some power, the Korth system still requires a source of adequate ambient lighting.

Power considerations aside, Korth's two-dimensional imaging system does not lend itself to portability with small companion devices such as cell phones because Korth's video camera (or perhaps cameras) requires a vantage point above the keyboard. This requirement imposes constraints on the practical size of Korth's system, both while the system is operating and while being stored in transit.

What is needed is a method and system by which a user may input data to a companion computing system using a virtual keyboard or other virtual input device that is not electrically connected to the computing system. The data input interface emulation implemented by such method and system should provide meaningful three-dimensionally acquired information as to what user's finger touched what key (or other symbol) on the virtual input device, in what time sequence, preferably without having to use multiple image-acquiring devices. Preferably such system should include signal processing such that system output can be in a scan-code or other format directly useable as input by the companion computing system. Finally, such system should be portable, and easy to set up and operate The present invention provides such a method and system.

SUMMARY OF THE INVENTION

The present invention enables a user to input commands and data (collectively, referred to as data) from a passive virtual emulation of a manual input device to a companion computer system, which may be a PDA, a wireless telephone, or indeed any electronic system or appliance adapted to receive digital input signals. The invention includes a three-dimensional sensor imaging system that functions even without ambient light to capture in real-time three-dimensional data as to placement of a user's fingers on a substrate bearing or displaying a template that is used to emulate an input device such as a keyboard, keypad, or digitized surface. The substrate preferably is passive and may be a foldable or rollable piece of paper or plastic containing printed images of keyboard keys, or simply indicia lines demarking where rows and columns for keyboard keys would be. The substrate may be defined as lying on a horizontal X-Z plane where the Z-axis define template key rows, and the X-axis defines template key columns, and where the Y-axis denotes vertical height above the substrate. If desired, in lieu of a substrate keyboard, the invention can include a projector that uses light to project a grid or perhaps an image of a keyboard onto the work surface in front of the companion device. The projected pattern would serve as a guide for the user in "typing" on this surface. The projection device preferably would be included in or attachable to the companion device.

Alternatively, the substrate can be eliminated as a typing guide. Instead the screen of the companion computer device may be used to display alphanumeric characters as they are "typed" by the user on a table top or other work surface (perhaps a table top) in front of the companion device. For users who are not accomplished touch typists, the invention can instead (or in addition) provide a display image showing keyboard "keys" as they are "pressed" or "typed upon" by the user. "Keys" perceived to be directly below the user's fingers can be highlighted in the display in one color, whereas "keys" perceived to be actually activated can be highlighted in another color or contrast. This configuration would permit the user to type on the work surface in front of the companion device or perhaps on a virtual keyboard. Preferably as the user types on the work surface or the virtual keyboard, the corresponding text appears on a text field displayed on the companion device.

Thus, various forms of feedback can be used to guide the user in his or her virtual typing. What fingers of the user's hands have "typed" upon what virtual key or virtual key position in what time order is determined by the three-dimensional sensor system. Preferably the three-dimensional sensor system includes a signal processing unit comprising a central processor unit (CPU) and associated read only memory (ROM) and random access memory (ROM). Stored in ROM is a software routine executed by the signal processing unit CPU such that three-dimensional positional information is received and converted substantially in real-time into key-scan data or other format data directly compatible as device input to the companion computer system. Preferably the three-dimensional sensor emits light of a specific wavelength, and detects return energy time-of-flight from various surface regions of the object being scanned, e.g., a user's hands.

At the start of a typing session, the user will put his or her fingers near or on the work surface or virtual keyboard (if present). Until the user or some other object comes within imaging range of the three-dimensional sensor, the present invention remains in a standby, low power consuming, mode. In standby mode, the repetition rate of emitted optical pulses is slowed to perhaps 1 to perhaps 10 pulses per second, to conserve operating power, an important consideration if the invention is battery powered. As such, the invention will emit relatively few pulses but can still acquire image data, albeit having crude or low Z-axis resolution. In alternate methods for three-dimensional capture, methods that reduce the acquisition frame rate and resolution to conserve power may be used. Nonetheless such low resolution information is sufficient to at least alert the present invention to the presence of an object within the imaging field of view. When an object does enter the imaging field of view, a CPU that governs operation of the present invention commands entry into a normal operating mode in which a high pulse rate is employed and system functions are now operated at full power. To preserve operating power, when the user's fingers or other potentially relevant object is removed from the imaging field of view, the present invention will power down, returning to the standby power mode. Such powering down preferably also occurs when it is deemed that relevant objects have remained at rest for an extended period of time exceeding a time threshold.

Assume that now the user has put his or her fingers on all of the home row keys (e.g., A, S, D, F, J, K, L, :) of the virtual keyboard (or if no virtual keyboard is present, on a work space in front of the companion device with which the invention is practiced). The present invention, already in full power mode will now preferably initiate a soft key calibration in which the computer assigns locations to keyboard keys based upon user input. The user's fingers are placed on certain (intended) keys, and based on the exact location of the fingers, the software assigns locations to the keys on the keyboard based upon the location of the user's fingers.

The three-dimensional sensor system views the user's fingers as the user "types" on the keys shown on the substrate template, or as the user types on a work space in front of the companion device, where "keys" would normally be if a real keyboard were present. The sensor system outputs data to the companion computer system in a format functionally indistinguishable from data output by a conventional input device such as a keyboard, a mouse, etc. Software preferably executable by the signal processing unit CPU (or by the CPU in the companion computer system) processes the incoming three-dimensional information and recognizes the location of the user's hands and fingers in three-dimensional space relative to the image of a keyboard on the substrate or work surface (if no virtual keyboard is present).

Preferably the software routine identifies the contours of the user's fingers in each frame by examining Z-axis discontinuities. When a finger "types" a key, or "types" in a region of a work surface where a key would be if a keyboard (real or virtual) were present, a physical interface between the user's finger and the virtual keyboard or work surface is detected. The software routine examines preferably optically acquired data to locate such an interface boundary in successive frames to compute Y-axis velocity of the finger. (In other embodiments, lower frequency energy such as ultrasound might instead be used.) When such vertical finger motion stops or, depending upon the routine, when the finger makes contact with the substrate, the virtual key being pressed is identified from the (Z, X) coordinates of the finger in question. An appropriate KEYDOWN event command may then be issued. The present invention performs a similar analysis on all fingers (including thumbs) to precisely determine the order in which different keys are contacted (e.g., are "pressed"). In this fashion, the software issues appropriate KEYUP, KEYDOWN, and scan code data commands to the companion computer system.

The software routine preferably recognizes and corrects for errors in a drifting of the user's hands while typing, e.g., a displacement on the virtual keyboard. The software routine further provides some hysteresis to reduce error resulting from a user resting a finger on a virtual key without actually "pressing" the key. The measurement error is further reduced by observing that in a typing application, the frame rate requirement for tracking Z-values is lower than the frame rate requirement for tracking X-values and Y-Values. That is, finger movement in Z-direction is typically slower than finger movements in other axes. The present invention also differentiates between impact time among different competing fingers on the keyboard or other work surface. Preferably such differentiation is accomplished by observing X-axis, Y-axis data values at a sufficiently high frame rate, as it is Y-dimension timing that is to be differentiated. Z-axis observations need not discriminate between different fingers, and hence the frame rate can be governed by the speed with which a single finger can move between different keys in the Z-dimension. Preferably the software routine provided by the invention averages Z-axis acquired data over several frames to reduce noise or jitter. While the effective frame rate for Z-values is decreased relative to effective frame rate for X-values and for Y-values, accuracy of Z-values is enhanced and a meaningful frame rate of data acquisition is still obtained.

The software routine can permit the user to toggle the companion computer system from say alphanumeric data input mode to graphics mode simply by "typing" on certain key combinations, perhaps simultaneously pressing the Control and Shift In graphics mode, the template would emulate a digitizer table, and as the user dragged his or her finger across the template, the (Z, X) locus of points being contacted would be used to draw a line, a signature, or other graphic that is into the companion computer system.

Preferably a display associated with the companion computer system can display alphanumeric or other data input by the user substantially in real-time. In addition to depicting images of keyboard keys and fingers, the companion computer system display can provide a block cursor that shows the alphanumeric character that is about to be entered. An additional form of input feedback is achieved by forming a resilient region under some or all of the keys to provide tactile feedback when a "key" is touched by the user's fingers. If a suitable companion device were employed, the companion device could even be employed to enunciate aloud the names of "typed" keys, letter-by-letter, e.g., enunciating the letters "c"-"a"-"t" as the word "cat" was typed by a user. A simpler form of acoustic feedback is provided by having the companion device emit electronic key-click sounds upon detecting a user's finger depressing a virtual key.

Other features and advantages of the invention will appear from the following description in which the preferred embodiments have been set forth in detail, in conjunction with the accompanying drawings.

BRIEF DESCRIPTION OF THE DRAWINGS

FIGS. 7A–7O depict cluster matrices generated from optically acquired three-dimensional data for use in identifying user finger location, according to the present invention.

DETAILED DESCRIPTION OF THE PREFERRED EMBODIMENT

Figure 1A:
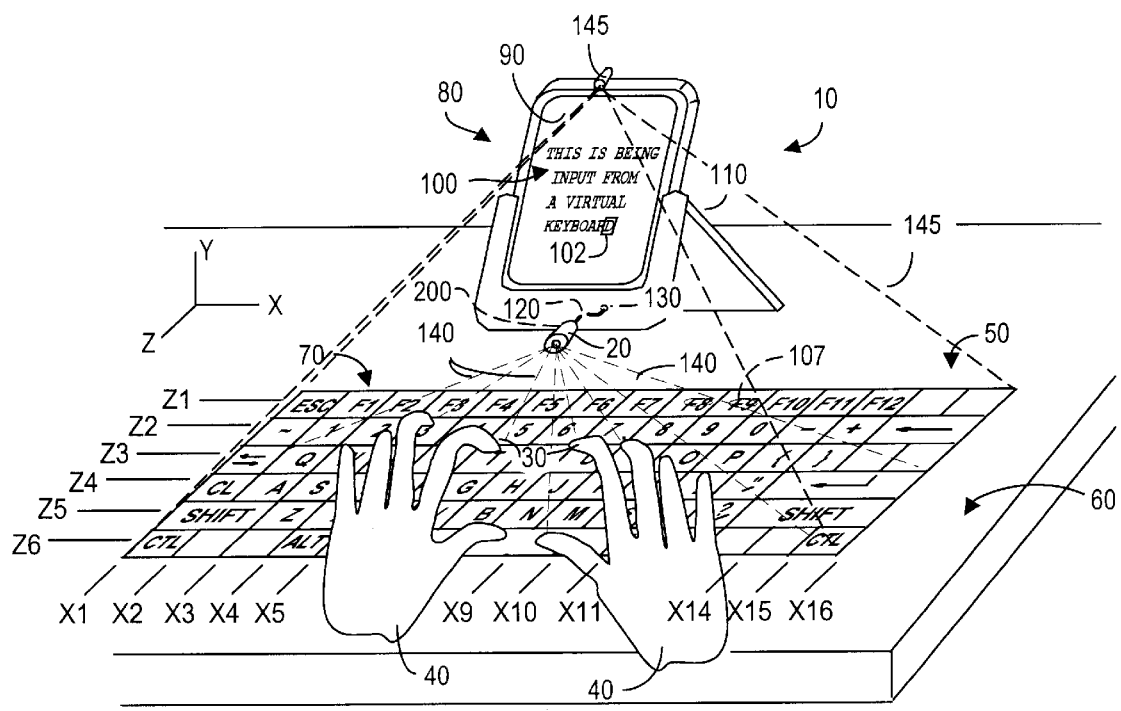
FIG. 1A depicts a three-dimensional sensor system used with a passive substrate keyboard template, according to the present invention.

FIG. 1A depicts a three-dimensional sensor system 10 comprising a three-dimensional sensor 20 focused essentially edge-on towards the fingers 30 of a user's hands 40, as the fingers "type" on a substrate 50, shown here atop a desk or other work surface 60. Substrate 50 preferably bears a printed or projected template 70 comprising lines or indicia representing a data input device, for example a keyboard. As such, template 70 may have printed images of keyboard keys, as shown, but it is understood the keys are electronically passive, and are merely representations of real keys. Substrate 50 is defined as lying in a Z-X plane in which various points along the X-axis relate to left-to-right column locations of keys, various points along the Z-axis relate to front-to-back row positions of keys, and Y-axis positions relate to vertical distances above the Z-X plane. It is understood that (X,Y,Z) locations are a continuum of vector positional points, and that various axis positions are definable in substantially more than few number of points indicated in FIG. 1A.

Figure 2A:
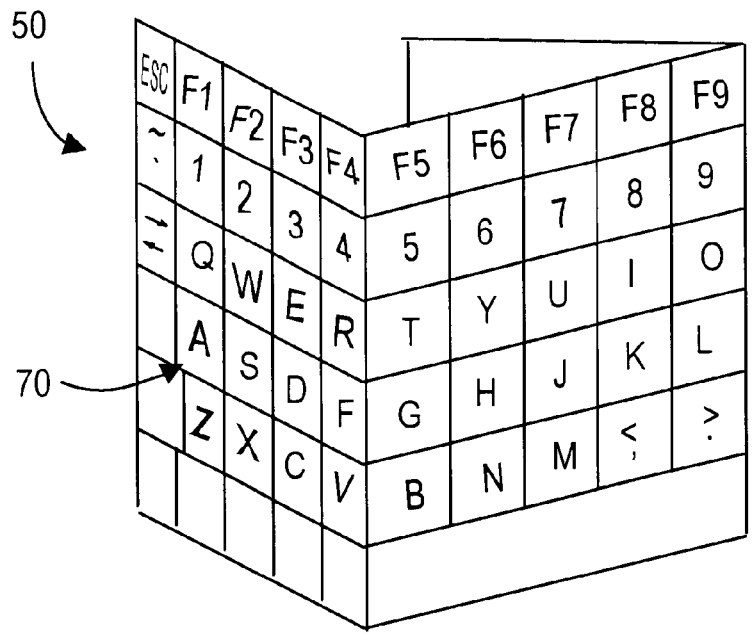
FIG. 2A depicts a passive substrate in a partially folded disposition, according to the present invention.
Figure 2B:
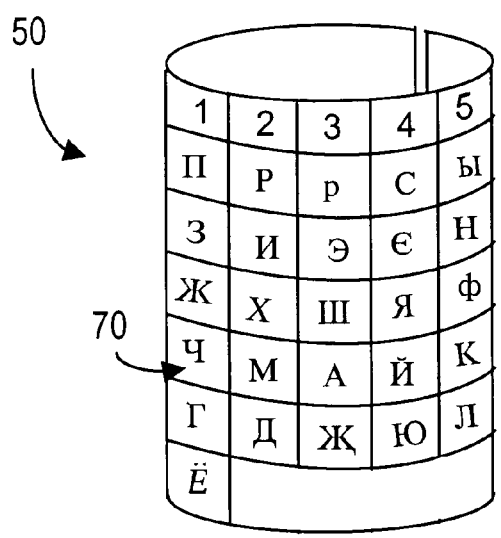
FIG. 2B depicts a passive substrate, bearing a different character set, in a partially rolled-up disposition, according to the present invention.

If desired, template 70 may simply contain row lines and column lines demarking where keys would be present. Substrate 50 with template 70 printed or otherwise appearing thereon is a virtual input device that in the example shown emulates a keyboard. As such substrate 50 and/or template 70 may be referred to herein as a virtual keyboard or virtual device for inputting digital data and/or commands. An advantage of such a virtual input device is that it may be printed on paper or flexible plastic and folded as shown in FIG. 2A, or rolled-up (or folded and rolled-up) as shown in FIG. 2B. It is understood that the arrangement of keys need not be in a rectangular matrix as shown for ease of illustration in several of the figures, but may be laid out in staggered or offset positions as in a real QWERTY keyboard. FIG. 2B also shows the device with an alternate keyset printed as template 70, here Cyrillic alphabet characters. If desired, one keyset could be printed on one side of the template, and a second keyset on the other, e.g., English and Russian characters.

Figure 1B:
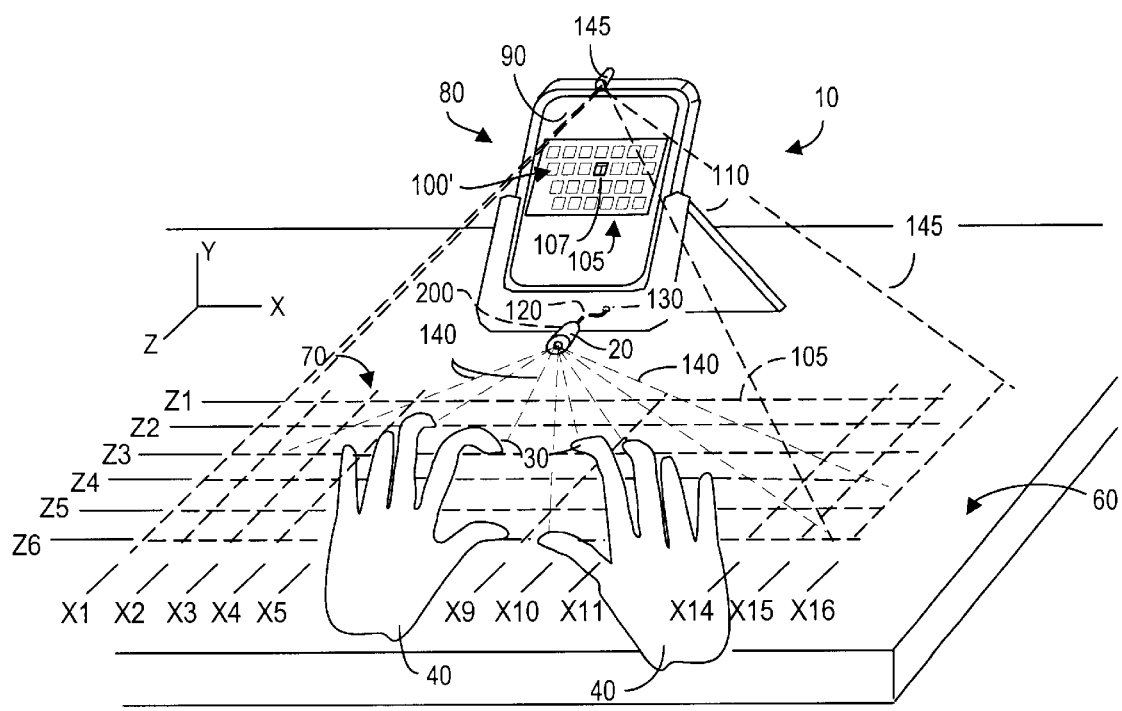
FIG. 1B depicts a three-dimensional sensor system that may be used without a substrate keyboard template, according to the present invention.
Figure 1C:
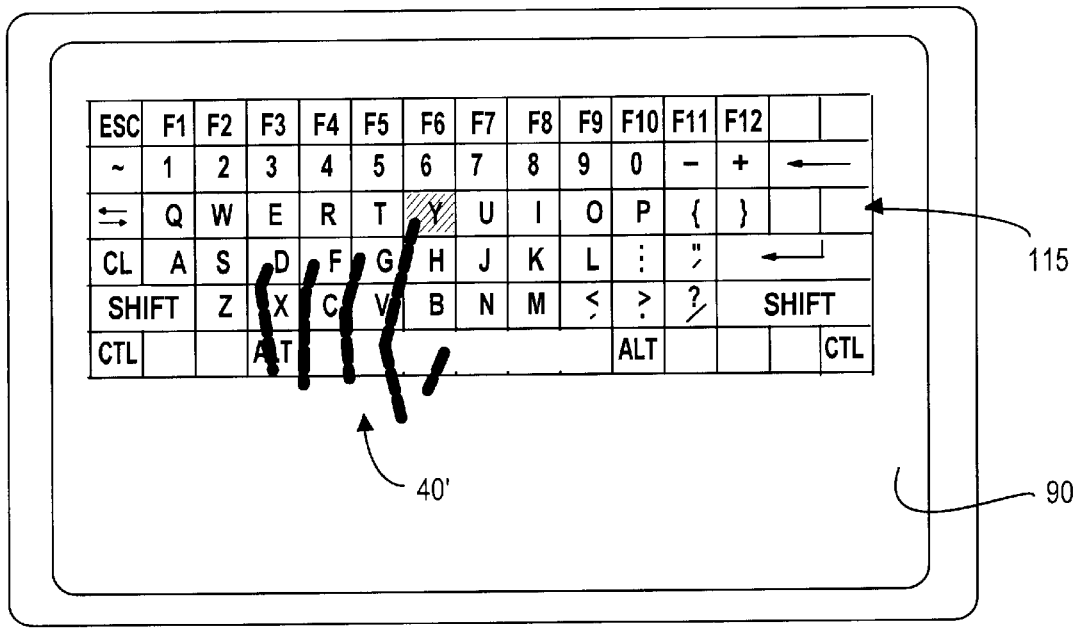
FIG. 1C depicts a companion device display of a virtual keyboard showing a user's finger contacting a virtual key, according to the present invention.
Figure 1D:
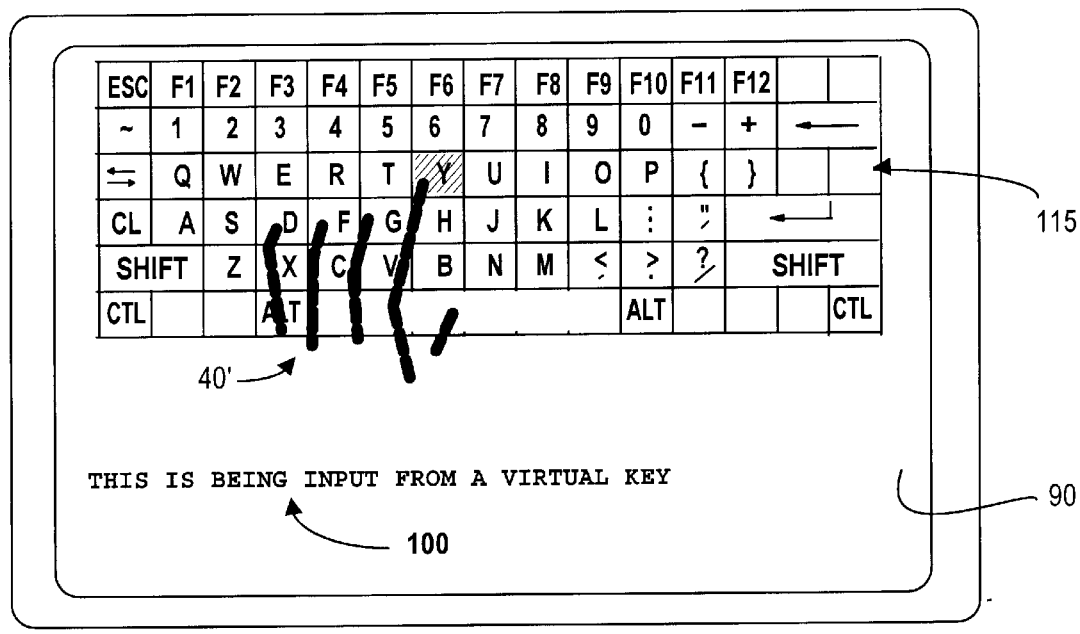
FIG. 1D depicts the display of FIG. 1C, showing in additional text entered by the user on a virtual keyboard, according to the present invention.

As described with respect to FIGS. 1B–1D, alternatively an image of a virtual keyboard may be displayed on the screen associated with the companion device. In this embodiment, the substrate and even the work surface can be dispensed with, permitting the user to "type" in thin air, if desired. This embodiment is especially flexible in permitting on-the-fly changes in the "keyboard" being used, e.g., presenting an English language keyboard, or a German language keyboard, a Russian language keyboard, to emulate a digitizer sheet, etc. The various keyboards and keysets are simply displayed on screen 90, associated with companion device or appliance 80. Understandably, great flexibility is achieved by presenting alternative key sets as displayed images of virtual keys bearing the various character sets on the display of the companion device with which the present invention is used. Thus, in FIG. 1B, the virtual keyboard has been eliminated as a guide, further promoting portability and flexibility.

In the various embodiments, data (and/or commands) to be input by a user from a virtual keyboard 50 (as shown in FIG. 1A), or from a work surface 60 devoid of even a virtual keyboard (as shown in FIG. 1B) will be coupled to a companion computer or other system 80. Without limitation, the companion computer system or computer-like system may be a PDA, a wireless telephone, a laptop PC, a pen-based computer, or indeed any other electronic system to which is desired to input data. If a virtual keyboard is used, it preferably may be folded or rolled when not in use. The folded or rolled size may be made sufficiently small to be stored with the PDA or other companion computer system 80, with which it will be used to input data and commands. For example, when folded a keyboard may measure perhaps 2.5"×3", and preferably at least smaller than say 8"×8". A virtual keyboard for a PDA might have a folded form factor sized to fit within a pocket at the rear of the PDA. However when in used, the virtual keyboard is unfolded or unrolled to become an essentially full sized albeit virtual keyboard.

As the user inputs data into companion system 80, the display 90 that typically is present on system 80 can display in real-time the data being input 100 from the virtual keyboard, for example, text that might be input to a PDA, e-mail that might be input to a wireless telephone, etc. In one embodiment, a block cursor 102 surrounds a display of the individual alphanumeric character that the invention perceives is about to be typed, the letter "d" in FIG. 1A, for example. This visual feedback feature can help a user confirm accuracy of data entry and perhaps provide guidance in repositioning the user's fingers to ensure the desired character will be typed. Acoustic feedback such as "key clicks" can be emitted by system 80 as each virtual key is pressed to provide further feedback to the user. If desired, passive bumps 107 may be formed in the virtual keyboard to give the user tactile feedback. By way of example, such bumps may be hemispheres formed under each "key" in a virtual keyboard fabricated from a resilient plastic, for example.

As noted, visual feedback may also, or instead, be provided by displaying an image of the virtual keyboard (be it a substrate or an empty work surface in front of the companion device) on the screen of the companion device. As the user types, he or she is guided by an image of a keyboard showing the user's fingers as they move relative to the virtual keyboard. This image can include highlighting the keys directly under the user's fingers, and if a key is actually pressed, such key can be highlighted in a different color or contrast. If desired, the screen of the companion device can be "split" such that actual alphanumeric characters appear on the top portion of the screen as they are "typed", and an image of virtual keys with the user's fingers superimposed appears on the bottom portion of the screen (or vice versa).

In FIG. 1A and FIG. 1B, the companion system 80 is shown mounted in an cradle 110, to which the three-dimensional sensor 20 may be permanently attached. Alternatively, sensor 20 could be permanently mounted within a preferably lower portion of companion device 80. Output from sensor 20 is coupled via path 120 to a data input port 130 on companion device 80. If a cradle or the like is used, insertion of device 80 into cradle 110 may be used to automatically make the connection between the output of sensor 20 and the input to device 80.

As described herein, the configuration of FIG. 1B advantageously permits a user to input data (e.g., text, graphics, commands) to companion device 80, even without a printed virtual keyboard, such as was shown in FIG. 1A. For ease of understanding, grid lines along the X-axis and Y-axis are shown on a work surface region 60 in front of the companion device 80. Various software mapping techniques, described herein, permit the present invention to discern what virtual keys (if keys were present) the user's fingers intended to strike. Whereas the embodiment of FIG. 1A allowed tactile feedback from a virtual keyboard, the embodiment of FIG. 1B does not. Accordingly it is preferred that screen 90 of device 80 display imagery to assist the user in typing. Of course, as in the embodiment of FIG. 1A, device 80 may emit acoustic key click sounds as the user's fingers press against surface 60 while "typing".

FIG. 1C depicts one sort of visual assistance available from an appropriate device 80, which assistance may of course be used with the embodiment of FIG. 1A. In FIG. 1C, screen 90 displays at least part of an image of a keyboard 115 and an outline or other representation 40' of the user's hands, showing hand and finger location relative to where keys would be on an actual or a virtual keyboard. For ease of illustration, FIG. 1C depicts only the location of the user's left hand. As a key is "touched" or the user's finger is sufficiently close to "touching" a key (e.g., location on surface 60 at which such key would be present if a keyboard were present), device 80 can highlight the image of that key (e.g., display the relevant "softkey"), and as the key is "pressed" or "typed upon", device 80 can highlight the key using a different color or contrast. For example in FIG. 1C, the "Y" key is shown highlighted or contrasted, which can indicate it is being touched or is about to be touched, or it is being pressed by the user's left forefinger. As shown in FIG. 1D, a split screen display can be provided by device 80 in which part of the screen depicts imagery to guide the user's finger placement on a non-existent keyboard, whereas another part of the screen shows data or commands 100 input by the user to device 80. Although FIG. 1D shows text that corresponds to what is being typed, e.g., the letter "Y" in the word "key" is highlighted as spelling of the word "key" on screen 90 is completed, data 100 could instead be a graphic. For example, the user can command device 80 to enter a graphics mode whereupon finger movement across surface 60 (or across a virtual keyboard 70) will produce a graphic, for example, the user's signature "written" with a forefinger or a stylus on surface 60. Collectively, user finger(s) or a stylus may be referred to as a "user digit".

Optionally software associated with the invention (e.g., software 285 in FIG. 3) can use word context to help reduce "typing" error. Assume the vocabulary of the text in a language being input is known in advance, English for example. Memory in the companion device will store a dictionary containing most frequently used words in the language and as the user "types" a word on a virtual keyboard or indeed in thin air, the companion device software will match letters thus far typed with candidate words from the dictionary. For instance, if the user enters "S", all words starting with letter "S" are candidates; if the user enters "SU", all words starting with "SU" are candidates. If the user types "SZ" then, at least in English, there will be no matching candidate word(s). As the user types more letters, the set of candidate words that can match the word being typed reduces to a manageable size. At some threshold point, for instance when the size of the candidate words reduces to 5–10 words, the software can assign a probability to the next letter to be typed by the user. For instance, if the user has entered "SUBJ", there is a higher probability that the next letter is the letter "E", rather than say the letter "W". But since letters "E" and "W" are neighbors on a real or virtual keyboard, it is possible that the user might press the region near the key for the letter "W". In this example, companion device software can be used to correct the key entry and to assume that the user meant to enter the letter "E".

Turning now to operation of three-dimensional sensor 20, the sensor emits radiation of a known frequency and detects energy returned by surfaces of objects within the optical field of view. Emitted radiation is shown in FIGS. 1A and 1B as rays 140. Sensor 20 is aimed along the Z-axis to determine which of the user's finger tips 30 touch what portions of template 70, e.g., touch which virtual keys, in what time order. As shown in FIG. 1B, even if template 70 were absent and the user simply typed on the work space in front of device 80, sensor 20 would still function to output meaningful data. In such an embodiment, screen 90 of companion device 80 could display an image 100' of a keyboard 105 in which "pressed" or underlying "keys" are highlighted, such as key 107, for the letter "T".

As shown in FIGS. 1A and 1B, if desired a light or other projector 145 that emits visual light beams 147 could be used to project an image of a virtual keyboard to guide the user in typing. For example, a source of visible light (perhaps laser light in a visible wavelength) may be used with diffraction type lenses to project an image to guide the user in typing. In such embodiments, the image of a keyboard, perhaps rendered in a common graphics file format (e.g., GIF) is used to "etch" a diffractive pattern on the lens. Although portions of the projected image would at times fall on the surface of the user's fingers, nonetheless in the absence of a substrate to type upon, such a projected guide can be useful. The use of diffractive optics including such optics as are commercially available from MEMS Optical, LLC of Huntsville, No. 35806 may find application in implementing such a projection embodiment.

Figure 3:
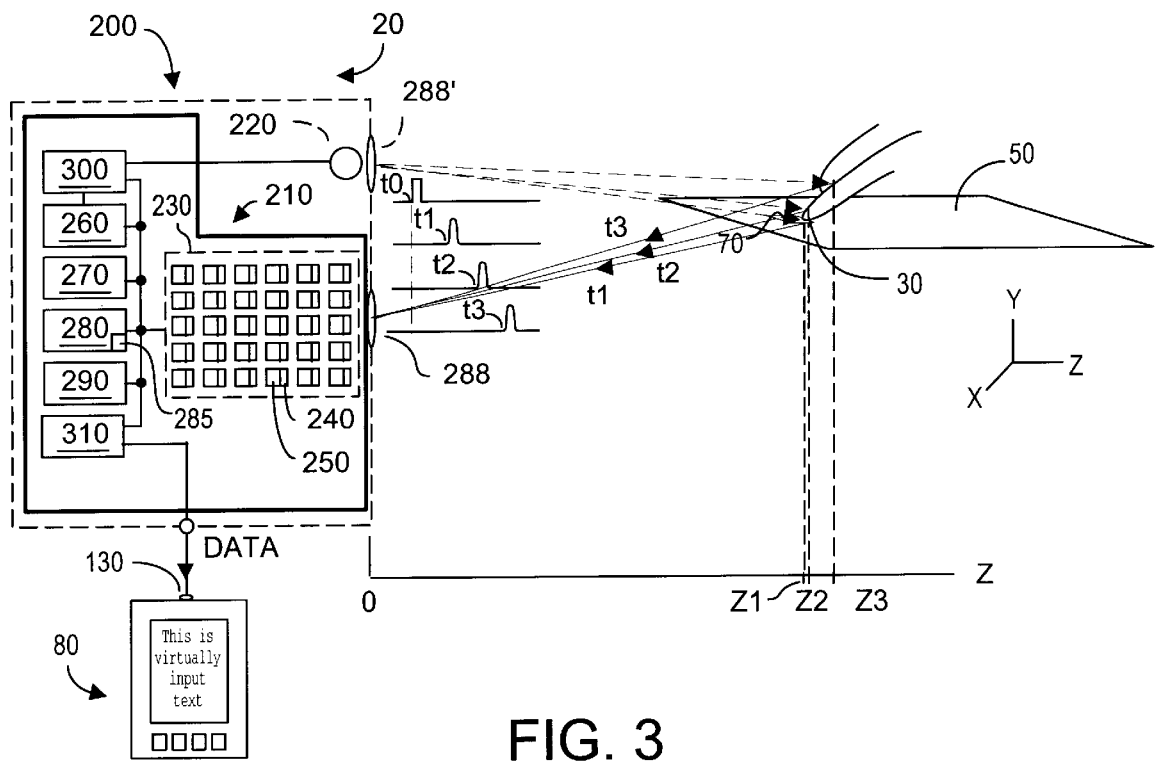
FIG. 3 is a block diagram of an exemplary implementation of a three-dimensional signal processing and sensor system, with which the present invention may be practiced.

FIG. 3 is a block diagram depicting an exemplary three-dimensional image sensor system 200 that preferably is fabricated on a single CMOS IC 210. System 200 may be disposed in the same housing as three-dimensional sensor 20, and is used to implement the present invention. As described in greater detail in co-pending U.S. application Ser. No. 09/401,059, incorporated herein by reference, such a system advantageously requires no moving parts and relatively few off-chip components, primarily an light emitting diode (LED) or laser source 220 and associated optical focusing system, and if suitable shielding were provided, one might bond laser source 220 onto the common substrate upon which IC 210 is fabricated. It is to be understood that while the present invention is described with respect to a three-dimensional sensor 20 as disclosed in the above-referenced co-pending U.S. utility patent application, the invention may be practiced with other three-dimensional sensors.

System 200 includes an array 230 of pixel detectors 240, each of which has dedicated circuitry 250 for processing detection charge output by the associated detector. In a virtual keyboard recognition application, array 230 might include 15×100 pixels and a corresponding 15×100 processing circuits 250. Note that the array size is substantially less than required by prior art two-dimensional video systems such as described by Korth. Whereas Korth requires a 4:3 aspect ratio or perhaps in some cases 2:1, the present invention obtains and processes data using an aspect ratio substantially greater than 3:1, and preferably about 15:2 or even 15:1. Referring to FIGS. 1A and 1B, it is appreciated that while a relatively large X-axis range must be encompassed, the edge-on disposition of sensor 20 to substrate 50 means that only a relatively small Y-axis distance need be encompassed.

During user typing, a high frame rate is required to distinguish between the user's various fingers along a row of virtual keys. However, the back and forth movement of a given typing finger is less rapid in practice. Accordingly the rate of acquisition of Z-axis data may be less than X-axis and Y-axis date, for example 10 frames/second for Z-axis data, and 30 frames/second for X-axis and for Y-axis data.

A practical advantage of a decreased Z-axis frame rate is that less electrical current is required by the present invention in obtaining keyboard finger position information. Indeed, in signal processing acquired information, the present invention can average Z-axis information over frames, for example examining one-third of the frames for Z-axis position information. Acquired Z-axis values will have noise or jitter that can be reduced by averaging. For example Z-values may be averaged over three successive thirty frame/second frames such that three consecutive image frames will share the same processed Z-values. While the effective frame rate for Z-values is lowered to one-third the acquisition rate for X-axis and Y-axis data acquisition, accuracy of the Z data is improved by averaging out the noise or jitter. The resultant decreased Z-axis frame rate is still sufficiently rapid to acquire meaningful information. This use of different frame rates for X-values and Y-values, versus Z-values is useful to the present invention. For example, a reduced acquisition rate of Z-axis data relative to X-axis and Y-axis data minimizes electrical current drain, and avoids taxing the signal processor (CPU 260) with redundant signal processing.

Thus, the present invention acquires three-dimensional image data without requiring ambient light, whereas prior art Korth-like systems acquire two-dimensional luminosity data in the presence of ambient light. In essence, the present invention can sense three-dimensionally objects, e.g., fingers and substrate, analogously to a human's feeling an object by touching. Advantageously, this can be accomplished using relatively small operating power, e.g., perhaps 3.3 VDC at 10 mW, which permits the present invention to be battery operated and fabricated in a relatively small and mobile form factor.

Multiple frames per second of three-dimensional image data of the user's hands and fingers and the substrate are available from array 230. Using this data the present invention constructs a three-dimensional image of the hands and fingers relative to the substrate, or if the substrate is absent, relative to where virtual keys would be if a keyboard were on the work surface in front of the companion device 80. Exemplary techniques for doing so are described in applicant Bamji's earlier referenced co-pending U.S. patent application. Constructing such a three-dimensional image from time-of-flight data is superior to prior art methods that attempt to guess at spatial relationships using two-dimensional luminosity based data, e.g., as suggested by Korth. It should be noted that time of flight methods may include return pulse time measurement, phase or frequency detection, or a high speed shutter method, as described in the Bamji patent application. Other methods that do not rely on time-of-flight can capture three-dimensional data, including stereo imagery, and luminosity-based techniques that discern depth from reflective intensity.

In practice, array 230 can acquire and generate data at 30 frames/second, a frame rate sufficient to process virtual typing of 5 characters/second, which is about 60 words/minute. If array 230 is rectangular, e.g., comprising a number n of X-axis pixels and a number m Y-axis pixels, if n=100 and m=15, then a grid comprising 1,500 pixels is formed. For each frame of data, each pixel in array 230 will have a value representing the vector distance from sensor 20 to the surface of the object (e.g., a portion of a user's finger, a portion of the substrate, etc.) captured by that pixel, e.g., a vector or Z-value. This data is far more useful than Korth's luminosity-based image data that at best provided video frames with RGB grey or color scale values in determining the contour of a user's fingers and location on a virtual keyboard, in two dimensions.

Use of acquired three-dimensional data permits software 285 to determine the actual shape of the user's fingers (nominally assumed to be somewhat cylindrical), and thus relative finger position with respect to other fingers, to location over or on the substrate, and relative to three-dimensional sensor 20. In FIG. 1A, for example, as a finger is sensed to be moving to a Y=0 position, it can be determined that the finger is probably preparing to type a virtual key. If that finger is also sensed to be approaching the Z=Z1 region, then that finger is probably prepared to type a virtual key in the first row of keys on the virtual keyboard. Determination of whether a virtual key is about to be pressed also takes into account velocity data. For example, a user finger detected to be moving rapidly downward toward Y=0 is probably getting ready to strike a virtual key.

In FIG. 3, IC 210 will also include a microprocessor or microcontroller unit 260 (denoted CPU), random access memory 270 (RAM) and read-only memory 280 (ROM), a portion of which ROM preferably holds a software routine 285 executable by the CPU to implement the present invention. Controller unit 260 preferably is a 16-bit RISC microprocessor operating at perhaps 50 MHz. Among other functions, CPU 260 performs vector distance to object and object velocity calculations, where the object is the substrate and user's hands. IC 210 further includes a high speed distributable clock 290, and various computing, optical drive input/output (I/O) circuitry 300, and interface data/command input/output (I/O) circuitry 310. Digital keyboard scan type data or digitizer tablet/mouse type data is output from I/O 310, for example from COM and/or USB type ports associated with system 200.

Preferably the two-dimensional array 230 of pixel sensing detectors is fabricated using standard commercial silicon technology, which advantageously permits fabricating circuits 250, 260, 270, 280, 290, and 300 on the same IC 210.

Understandably, the ability to fabricate such circuits on the same IC with the array of pixel detectors can shorten processing and delay times, due to shorter signal paths.

Each pixel detector may be represented as a parallel combination of a current source, an ideal diode, and shunt impedance and noise current source. Each pixel detector will output a current proportional to the amount of incoming photon light energy falling upon it. Preferably CMOS fabrication is used to implement the array of CMOS pixel diodes or photogate detector devices. For example photodiodes may be fabricated using a diffusion-to-well, or a well-to-substrate junction. Well-to-substrate photodiodes are more sensitive to infrared (IR) light, exhibit less capacitance, and are thus preferred.

Figure 4:
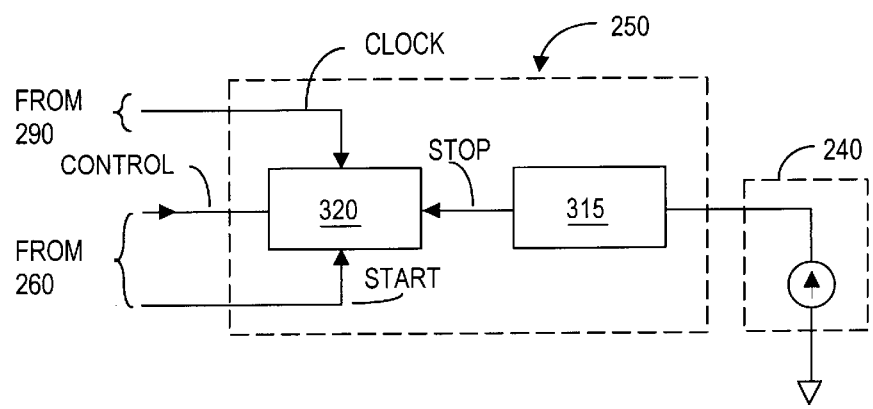
FIG. 4 is a block diagram of an exemplary single pixel detector with an associated photon pulse detector and high speed counter as may be used in a three-dimensional sensor system with which the present invention may be practiced.

As shown in FIGS. 3 and 4, a circuit 250 is associated with each pixel detector 240. Each circuit 250 preferably includes a pulse peak detector 315, a high speed counter 320, and has access to the high speed clock 290. Preferably formed on IC 210, high speed clock 200 outputs a continuous train of high frequency clock pulses preferably at a fixed frequency of perhaps 500 MHz, preferably with a low duty cycle as the pulses are output. Of course, other high speed clock parameters could instead be used. This pulse train is coupled to the input port of each high speed interpolating counter 320. Counter 320 preferably can sub-count, as described in the Bamji pending patent application, and can resolve times on the order of 70 ps. Preferably each counter 320 also has a port to receive a START signal (e.g., start now to count), a port to receive a STOP signal (e.g., stop counting now), and a port to receive a CONTROL signal (e.g., reset accumulated count now). The CONTROL and START signals are available from controller 260, the CLOCK signal is available from clock unit 290, and the STOP signal is available from pulse peak detector 315.

The term sensor system may be used collectively to refer to and include sensor array 230, lens 288 (if present), emitter 220, lens 288' (if present), and electronics coordinating timing relationships between emitter 220 and array 230.

Virtual keyboard 50 will be placed perhaps 20 cm distant from three-dimensional sensor 20, substantially in the same plane as the sensor lens. Since a typical sensor lens angle is perhaps 60°, a 20 cm distance ensures optical coverage of the virtual keyboard. In FIG. 3, for ease of illustration the distance between sensor 20 light emissions and collected light has been exaggerated.

In overview, system 200 operates as follows. At time t0 microprocessor 260 commands light source 220 to emit a pulse of light of known wavelength, which passes through focus lens 288' and travels at the speed of light (C), 300,000 km/sec. toward objects of interest, e.g., substrate 50 and user's fingers 30. If light source 220 is sufficiently powerful, lens 288' may be dispensed with. At the surface of the object being imaged at least some of the light may be reflected back toward system 200 to be sensed by the detector array. In FIG. 3, the objects of interest are the fingers 30 of a user's hand, and, if present, substrate 50, which as noted may include viewable indicia such as keyboard keys 70 or perhaps projected grid lines, to guide the user in finger placement while "typing".

As was indicated by FIG. 1A, the position of virtual keys 70 (or other user available indicia) on substrate 50 is known in two dimensions on the X-Z plane relative to the position of other such keys on the substrate. As the user's fingers move back and forth over substrate 50, touching virtual keys 70 while "typing", it is a function of CPU 260 and software routine 285 to examine return optical energy to identify which, if any, virtual keys are being touched by the user's fingers at what times. Once this information is obtained, appropriate KEYUP, KEYDOWN, and key scan code or other output signals may be provided to input port 130 of the companion device 80, just as though the data or commands being provided were generated by an actual keyboard or other input device.

At or before time t0, each pixel counter 310 in array 230 receives a CONTROL signal from controller 260, which resets any count previously held in the counter. At time t0, controller 260 issues a START command to each counter, whereupon each counter begins to count and accumulate CLOCK pulses from clock 290. During the roundtrip time of flight (TOF) of a light pulse, each counter accumulates CLOCK pulses, with a larger number of accumulated clock pulses representing longer TOF, which is to say, greater distance between a light reflecting point on the imaged object and system 200.

The fundamental nature of focus lens 288 associated with system 200 is such that reflected light from a point on the surface of imaged object 20 will only fall upon the pixel in the array focused upon such point. Thus, at time t1, photon light energy reflected from the closest point on the surface of object 20 will pass through a lens/filter 288 and will fall upon the pixel detector 240 in array 230 focused upon that point. A filter associated with lens 288 ensures that only incoming light have the wavelength emitted by light source 220 falls upon the detector array unattenuated.

Assume that one particular pixel detector 240 within array 230 is focused upon a nearest surface point on the tip 70 of the nearest user's finger. The associated detector 300 will detect voltage that is output by the pixel detector in response to the incoming photon energy from such object point. Preferably pulse detector 300 is implemented as an amplifying peak detector that senses a small but rapid change in pixel output current or voltage. When the rapidly changing output voltage is sufficiently large to be detected, logic within detector 300 (e.g., an SR flipflop) toggles to latch the output pulse, which is provided as the STOP signal to the associated counter 320. Thus, the number of counts accumulated within the associated counter 320 will be indicative of roundtrip TOF to the near portion of the fingertip in question, a calculable distance Z1 away.

Distance Z1 may be determined from the following relationship in which C is the velocity of light:

$$Z1 = C \cdot (t1-t0)/2$$

At some later time t2 photon energy will arrive at lens 288 from a somewhat more distant portion of the user's fingertip, 30, and will fall upon array 230 and be detected by another pixel detector. Hitherto the counter associated with this other detector has continued to count CLOCK pulses starting from time t0, as indeed have all counters except for the counter that stopped counting at time t1. At time t2, the pulse detector associated with the pixel just now receiving and detecting incoming photon energy will issue a STOP command to the associated counter. The accumulated count in this counter will reflect roundtrip TOF to the intermediate point on the fingertip, a distance Z2 away. Within IC 210, controller 260 executing software routine 285 stored in memory 280 can calculate distance associated with the TOF data for each light reflecting point on the object surface. Velocity can be calculated by examining successive frames of acquired data.

In similar fashion, at time t3 yet another pixel detector in the array will detect sufficient just-arriving photon energy for its associated pulse detector 300 to issue a STOP command to the associated counter. FIG. 3 depicts exemplary relationships between an outgoing signal from emitter 220 at time t0, and incoming return signals at times t1, t2, t3, where the t1 signal is returned from an object distance Z1, the t2 signal is returned from a farther object distance Z2, and the t3 signal is returned from a still farther object distance Z3. The accumulated count in this counter represents TOF data for a still farther distance Z3 to the imaged object. Although for ease of illustration FIG. 3 shows but three emitted light rays and light reflections, all falling near one fingertip, in practice substantially all of the substrate and user's fingers and thumbs will be subjected to illumination from light source 220, and will reflect at least some energy into lens 288 associated with three-dimensional sensor 20.

Some pixels in the array may of course not receive sufficient reflected light from the object point upon which they are focused. Thus, after a predetermined amount of time (that may be programmed into controller 260), the counter associated with each pixel in the sensor array will have been stopped due to pulse detection (or will be assumed to hold a count corresponding to a target at distance Z=infinity).

As noted, in the present application it suffices if system 200 can accurately image objects within a range of perhaps 20 cm to 30 cm, e.g., about 20 cm plus the distance separating the top and the bottom "row" of virtual keys on substrate 50. With each detected reflected light pulse, the counter-calculated TOF distance value for each pixel in the array is determined and preferably stored in a frame buffer in RAM associated with unit 270. Preferably microprocessor 260 examines consecutive frames stored in RAM to identify objects and object location in the field of view. Microprocessor 260 can then compute object, e.g., finger movement velocity. In addition to calculating distance and velocity, the microprocessor and associated on-chip circuitry preferably are programmed to recognize the outline or contours of the user's fingers, and to distinguish the finger surfaces from the substrate surface. Once the finger contours are identified, system 200 can output via a COM or USB or other port relevant digital data and commands to the companion computer system.

The above example described how three pixel detectors receiving photon energies at three separate times t1, t2, t3 turn-off associated counters whose accumulated counts could be used to calculate distances Z1, Z2, Z3 to finger surfaces and the substrate in the field of view. In practice, the present invention will process not three but thousands or tens of thousands of such calculations per each light pulse, depending upon the size of the array. Such processing can occur on IC chip 210, for example using microprocessor 260 to execute routine 285 stored (or storable) in ROM 280. Each of the pixel detectors in the array will have unique position locations on the detection array, and the count output from the high speed counter associated with each pixel detector can be uniquely identified. Thus, TOF data gathered by two-dimensional detection array 230 may be signal processed to provide accurate distances to three-dimensional object surfaces, such as a user's fingers and a substrate. It will be appreciated that output from CMOS-compatible detectors 240 may be accessed in a random manner if desired, which permits outputting TOF DATA in any order.

Light source 220 is preferably an LED or a laser that emits energy with a wavelength of perhaps 800 nm, although other wavelengths could instead be used. Below 800 nm wavelength, emitted light starts to become visible and laser efficiency is reduced. Above 900 nm CMOS sensor efficiency drops off rapidly, and in any event, 1100 nm is the upper wavelength for a device fabricated on a silicon substrate, such as IC 210. As noted, by emitted light pulses having a specific wavelength, and by filtering out incoming light of different wavelength, system 200 is operable with or without ambient light. If substrate 50 contained, for example, raised ridges defining the outlines of virtual keys, a user can literally type in the dark and system 200 would still function properly. This ability to function without dependence upon ambient light is in stark contrast to prior art schemes such as described by Korth. As noted, even for users who are not accomplished touch typists, the present invention may be used in the dark by providing an image of a virtual keyboard on the display of companion device 80.

As noted, lens 288 preferably focuses filtered incoming light energy onto sensor array 230 such that each pixel in the array receives light from only one particular point (e.g., an object surface point) in the field of view. The properties of light wave propagation allow an ordinary lens 288 to be used to focus the light onto the sensor array. If a lens is required to focus the emitted light, a single lens could be used for 288, 288' if a mirror-type arrangement were used.

In practical applications, sensor array 230 preferably has sufficient resolution to differentiate target distances on the order of about 1 cm, which implies each pixel must be able to resolve time differences on the order of about 70 ps (e.g., 1 cm/C). In terms of a CMOS-implemented system specification, high speed counters 320 must be able to resolve time to within about 70 ps, and peak pulse detectors 315 must be low-noise high speed units also able to resolve about 70 ps (after averaging about 100 samples) with a detection sensitivity on the order of perhaps a few hundred microvolts ($\mu V$). Accurate distance measurements will require that the pulse detector response time be removed from the total elapsed time. Finally, the CLOCK signal output by circuit 280 should have a period on the order of about 2 ns.

At or before time t0, each pixel counter 320 in array 230 receives a CONTROL signal from controller 260, which resets any count previously held in the counter. At time t0, controller 260 issues a START command to each counter, whereupon each counter begins to count and accumulate CLOCK pulses from clock 290. During the roundtrip time of flight (TOF) of a light pulse, each counter accumulates CLOCK pulses, with a larger number of accumulated clock pulses representing longer TOF, which is to say, greater distance between a light reflecting point on the imaged object and system 200.

To achieve the required cycle time, a so-called pseudo random sequence counter (PRSC), sometimes termed a linear shift register (LSR), may be used. Details for implementing high speed counters including PRSC units may be found in applicant's earlier-referenced co-pending utility patent application.

Figure 5:
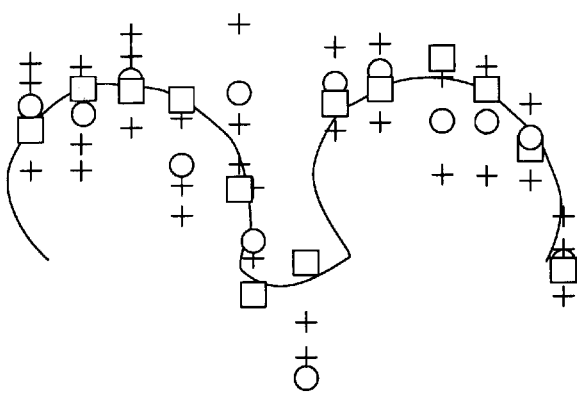
FIG. 5 depicts contour recognition of a user's fingers, according to the present invention.

Considerations involved in recognizing contour of the user's fingers within the optical field of view will now be described with reference to FIG. 5, which depicts a cross-section of two of the user's fingers. The +symbols show sub-frame (intra-frame) samples of vector distance values for each pixel sensor in array 210 imaging the fingers. Inherent noise associated with the pixel sensors produces varying vector distances to the same point of the imaged finger object in each acquired sample. To reduce noise and improve signal/noise, the sensor averages out measurements for each pixel to produce average values for the frame, shown by the ○ symbol in FIG. 5. The □ symbol in FIG. 5 represents the corrected average when a template, or set of stored exemplary finger-shaped cross-sections, is used by routine 285 to interpret the average values. This method enhances distance measurement accuracy, and reduces ambiguity in recognizing the user's fingers.

Data capture noise can affect the minimum frame rate needed to recognize the user's fingers and determine finger motion and velocity. In TOF-based imagery, as used in the present invention, pixel-level noise manifests itself as variations in distance values for a given pixel, from one frame to another frame, even if the imaged object remains stationary.

Figure 6:
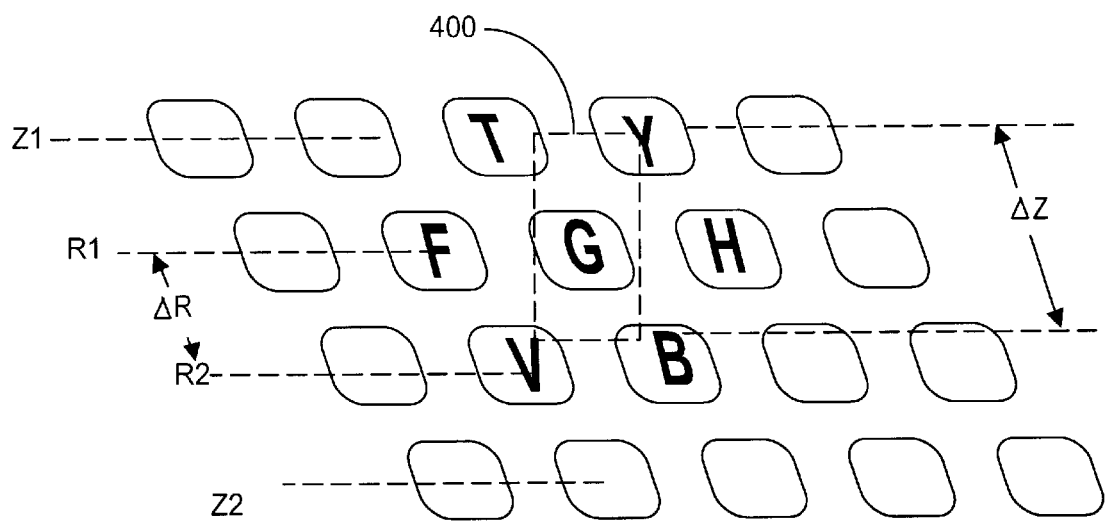
FIG. 6 depicts use of staggered key locations in identifying a pressed virtual key, according to the present invention.

For ease of illustration, the keyboard images depicted in FIGS. 1A and 2A, 2B were drawn as a matrix, e.g., uniform rows and columns. But in practice, as shown partially in FIG. 6, standard QWERTY-type keyboards (and indeed keyboards with other key configurations) are laid out in an offset or staggered configuration. The present invention advantageously reduces the requirement for Z-axis resolution by taking into account the staggering of actual keyboard layouts. Thus, the second row from the top of a keyboard is shifted slightly to the right, and the third row (from the top) is shifted further to the right, and so on. This staggering places the keys in each row at an offset position with respect to the keys in the adjacent row. By way of example, note the keyboard letter "G" in FIG. 6. Dotted rectangle 400 indicates allowable latitude given a user in striking the letter "G", e.g., any virtual contact within the rectangle area will unambiguously be interpreted as user finger contact on the letter "G". The height of this rectangle, denoted by Z is the maximum error margin allowed in detecting a Z-axis coordinate. Note that this margin is greater than the height of a single row R in a QWERTY keyboard. It is also noted that the region of recognition for a key need not be rectangular, and may be of any reasonable shape, for example, an ellipse centered at the key.

As acquired frames of three-dimensional data become available to CPU 270 and to routine 285, recognition of the user's fingers from the acquired data proceeds. This task is simplified in that the data indeed includes a three-dimensional representation of the user's fingers, and the fingers will have a reasonably well known shape, e.g., when viewed edge-on, they are somewhat cylindrical in shape. As noted, storing exemplary templates of finger shapes and finger and hand heuristics in memory 280 expedites finger recognition by reducing CPU time needed to recognize and track finger positions. Such signal processing can quickly reduce data capture noise and more readily discern the user's fingers from among the three-dimensional data acquired. Signal to noise ratio can also be improved in intra-frame states in that knowledge of the scene being imaged is known, e.g., the scene comprises a virtual keyboard and user's hands. Preferably a few hundred data captures are averaged or otherwise used to construct a frame of acquired data.

Once the user's fingers are recognized, software routine 285 (or an equivalent routine, perhaps executed by other than CPU 260, can next determine position and motion (e.g., relative change of position per unit time) of the fingers. Since data representing the fingers are in three dimensions, routine 285 can readily eliminate background images and focus only on the user hands. In a Korth two-dimensional imaging scheme, this task is very difficult as the shape and movement of background objects (e.g., a user's sleeve, arm, body, chair contour, etc.) can confuse object tracking and recognition software routines.

Using contour of the finger tips, routine 285 uses Z-axis distance measurements to determine position of the fingers with respect to the rows of the virtual keyboard, e.g., distance Z1 or Z2 in FIG. 1A. As noted, the granularity of such axis measurements is substantially greater than what is depicted in FIG. 1A. X-axis distance measurements provide data as to fingertip position with respect to the columns of the virtual keyboard. Using row and column co-ordinate numbers, software 285 can determine the actual virtual key touched by each finger, e.g., key "T" by the left forefinger in FIG. 1A.

To help the user orient the fingers on a particular virtual input device such as a keyboard, numeric pad, telephone pad, etc., software within the companion device 80 can be used to display a soft keyboard on a screen 90 associated with the device (e.g., a PDA or cellular telephone screen), or on a display terminal coupled to device 80. The soft keyboard image will show user finger positions for all keys on (or close to) virtual keyboard 50, for example by highlighting keys directly under the user's fingers. When a key is actually struck (as perceived by the user's finger movement), the struck key may be highlighted using a different color or contrast. If the virtual keys are not in a correct rest position, the user can command the companion device to position the virtual keyboard or other input device in the proper starting position. For instance, if the user typically begins to key by placing the right hand fingers on home row J, K, L, and ":" keys, and the left fingers on F, D, S and A keys, the software will move the keys of the virtual keyboard to such a position.

Vertical Y-axis motion of the user's fingers is sensed to determine what virtual keys on device 50 are being typed upon, or struck. While typing on a mechanical keyboard several fingers may be in motion simultaneously, but normally only one finger strikes a key, absent double key entries such pressing the CONTROL key and perhaps the "P" key, or absent a typographical error. In the present invention, software routine 285 determines finger motion information from successive frames of acquired information. Advantageously, the human hand imposes certain restrictions upon finger motion, which restrictions are adopted in modeling an image of the user's hands and fingers. For example, a connectiveness property of the fingers imposes certain coupling between movement of the fingers. The degree of freedom at the finger joints gives certain freedom to each finger to move, for example to move nearer or further from other fingers. Routine 285 advantageously can employ several heuristics to determine what virtual key is actually being struck. For instance, a keystroke can be sensed as commencing with a detected finger up movement followed by a quick finger down motion. A user's finger having the smallest Y-axis position or the greatest downward velocity is selected as the key entry finger, e.g., the finger that will strike one of the virtual keys on the virtual data input device.

Unintended key entry by a user is discerned by intelligently monitoring movement of the user's fingers. For example, the user may rest the fingers on a surface of substrate 50 without triggering unintended key entries. This is analogous to a condition where a typist using a mechanical keyboard rests his or her fingers on the keys without pressing any key sufficiently hard to type. A user of the present invention is also permitted to move his or her fingers gently over the virtual keyboard without unintentional triggering any key. Software 285 can calibrate its operation such that only intentional gestures are admitted as valid key entry to input data or commands to the companion computer device 80.

Software 285 upon execution by a CPU such as CPU 270 may be used to implement an algorithm or routine to recognize what virtual keys are being typed upon by a user of the present invention. Input data for the algorithm is three-dimensional optical information obtained from sensor 20. An exemplary algorithm may be considered as having three phases: building and personalizing templates, calibration, and actually tracking user typing on a virtual keyboard or work surface. In the description that follows it will be assumed that normal typing is undertaken in which all fingers are used. For instances, where one or two fingers only are used, a special case of the algorithm will apply.

Templates are understood to be predefined models of different typing posture for different users. This class of templates is based upon analysis of a population of system users, whose various typing styles will have been classified. It is to be noted that the templates may be derived from examples of input data (e.g examples of data collected by observing fingers in typing position) or from a preprogrammed mathematical description of the geometrical properties of the objects to be tracked (e.g. a cylindrical description for fingers). The resultant templates may be created at the time ROM 280 and especially routine 285 is fabricated. Since the position and shape of keyboard keys imposes certain commonalities of style upon users, it will be appreciated that the number of predefined templates need not be excessively large.

Preferably individual users of the present invention can also construct their own dedicated templates using a training tool that guides the user through the steps needed to build a template. For instance, a training program portion of software 285 can present on display 90 commands telling the user to place his or her fingers in typing position on the virtual keyboard, if present, or the work surface in front of the companion device 80. The training program will then tell the user to repeatedly press a virtual key under each finger. Optically capturing thumb movement can be treated as a special case since thumb movement differs from finger movement and typically is restricted to repressing the space bar region of a virtual keyboard or work surface.

In building the template, it is desired to construct a classification of the objects in the template image as being the different fingers of the user's hands. As described in further detail following, this method step collects information for the classifier or algorithm routine as to the physical properties of the user's hand. Later, during actual typing, the classifier uses this template to quickly map image in acquired frames to each user's fingers. As part of the template construction, preferably a mapping of the positions of the user's fingers to specific keyboard keys at a rest position is defined. For instance, routine 285 and CPU 270 can instruct the companion device 80 that, at rest, the user's left hand fingers touch the: "A", "S", "D" and "F" keys, and the user's right hand fingers touch the "J", "K", "L", and ":" keys. Such method step personalizes the virtual keyboard to the style of a particular user. This personalization process is carried out once and need not be repeated unless the user's typing posture changes substantially to where too many wrong keys are being identified as having been typed upon. A calibration process according to the present invention may be carried out as follows. At the start of a typing session, the user will so signal the companion device 80 by putting the application being run by device 80 in a text input mode. For example, if device 80 is a PDA, the user can touch a text field displayed on screen 80 with a stylus or finger, thereby setting the input focus of the companion 80 application to a text field. Other companion devices may be set to the appropriate text input mode using procedures associated with such devices.

Next the user's fingers are placed in a typing position in the work surface in front of three-dimensional sensor 20, either on a virtual keyboard or simply on the work surface. This step is used to map the user fingers to the elements of the template and to calibrate the user's fingers to the keys of the virtual keyboard (or work surface) before a typing session starts.

At this juncture, three-dimensional sensor 20 will be repeatedly capturing the contour map of the user's fingers. The data thus captured will be placed, e.g., by software 285 in a table or matrix such as shown in FIGS. 7A–7O.

Figure 7A:
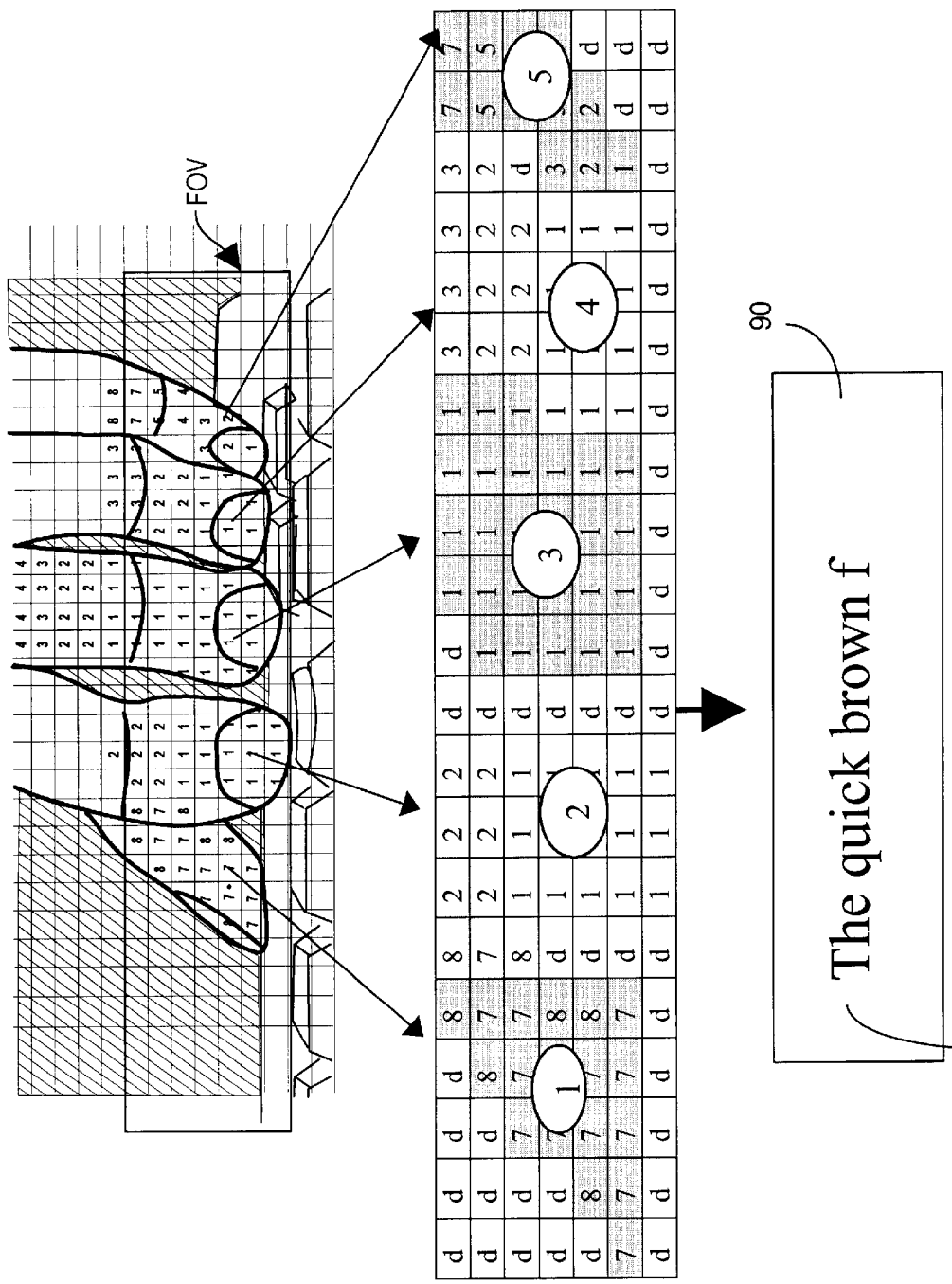

FIG. 7A depicts a user's left hand typing on an actual keyboard, as imaged by sensor 20. The field of view (FOV) of sensor 20 is intentionally directed toward the upper work surface, which in this example was an actual keyboard. Five fingers of the left hand are shown, and may be identified as fingers 1 (thumb), 2, 3, 4, and 5 (little finger). The cross-hatched region behind and between the fingers indicates regions too dark to be considered part of the user's fingers by the present invention. In an actual setting, there would of course be varying degrees of darkness, rather than the uniform dark region shown here for ease of understanding, and of depiction.

An overlay grid-like matrix or table is shown in FIG. 7A, in which various regions have quantized digits representing a normalized vector distance between the relevant surface portion of a user's finger and sensor 20. It is understood that these quantized distance values are dynamically calculated by the present invention, for example by software 285. In the mapping shown in FIG. 7A, low digit values such as 1, 2, represent close distances, and higher values such as 7, 8 represent large distances. The "d" values represent perceived discontinuities. Depending on the technology associated with sensor 20, values of "d" may oscillate widely and can indicate the absence of a foreground object. In FIG. 7A, the quantized distance values indicate that the user's left thumb is farther away from sensor 20 (as indicated by relatively high distance values of 7 and 8) than is the user's left forefinger, whose distance values are relatively low, e.g., 1. It is also seen that the user's left little finger is in generally more distance from sensor 20 than is the user's forefinger.

Figures 7B, 7C, 7D:
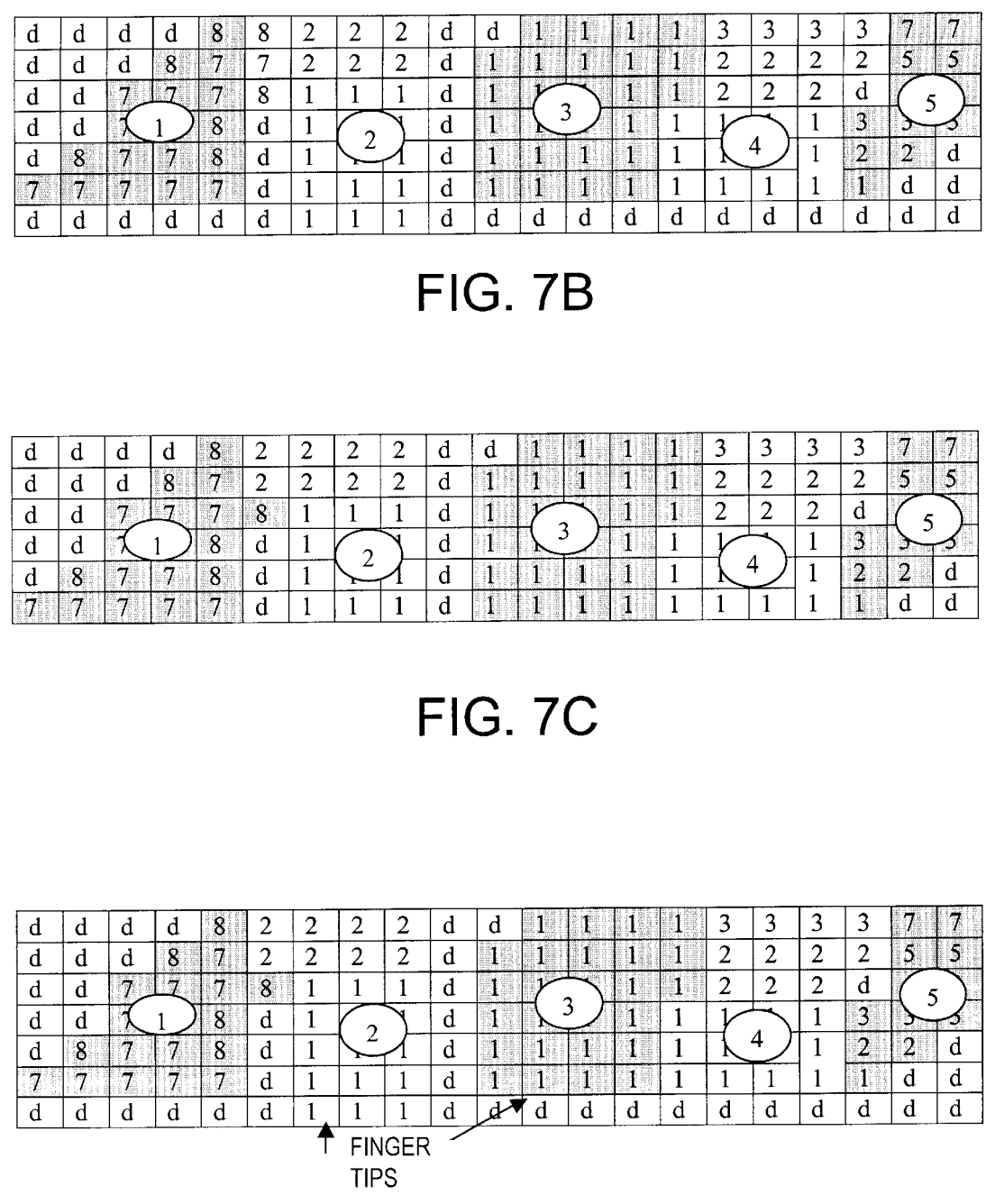

The central portion of FIG. 7A is a table or matrix showing the normalized distance values and, where applicable, "d" entries. A similar table is also shown in FIGS. 7B–7O. The table entries can represent contours of user fingers, and shading has been added to these tables to assist in showing potential mapping of distance data to an outline of the user's fingers. Arrows from the FOV portion of FIG. 7A pointing to columns in the table indicate how various columns of data can indeed represent contours of user finger position. In the tables shown in FIGS. 7A–7O, circled numbers "1", "2" . . . "5" depict contours corresponding to perceived location of the users left thumb (finger "1"), forefinger, middle finger, ring finger, and little finger (finger "5") respectively.

As described earlier, templates preferably are used in the present invention to help identify user finger positions from data obtained from sensor 20. Templates can assist classification algorithm (or classifier) 285 in distinguishing boundaries between fingers when discontinuities are not necessarily apparent. For example, in FIG. 7A, the third and fourth user's fingers (fingers 3 and 4) are relatively close together.

Shown at the bottom of FIG. 7A is a dynamic display of what the user is typing, based upon analysis by the present invention of the sensor-perceived distance values, dynamic velocity values, as well as heuristics associated with the overall task of recognizing what keys (real or virtual) are being pressed at what time. Thus, at the moment captured in FIG. 7A, the user's left forefinger (finger 2) appears to have just typed the letter "f", perhaps in the sentence "The quick brown fox jumped over the lazy dog", as the partially typed phrase 100 might appear on display 90 of a companion device 80.

Preferably the calibration phase of software routine 285 is user-friendly. Accordingly, routine 285 in essence moves or relocates the virtual keyboard to under the user's fingers. Such procedure may be carried out by mapping the image obtained from sensor 20 to the fingers of the template, and then mapping the touched keys to the natural position for the user, which natural position was determined during the template construction phase.

The calibration step defines an initial state or rest position, and maps the user's fingers at rest position to specific keys on the keyboard. As shown in FIG. 1B, the "keys" 107 that are touched or very nearby (but not pressed) preferably are highlighted on a soft-keyboard 105 displayed on screen 90 of companion device 80, assuming of course that a screen 90 is available. This rest position will also be the position that the user's fingers assume at the end of a typing burst.

During actual typing, routine 285 senses the user's fingers and maps finger movements to correct keys on a virtual keyboard. Before starting this phase of the algorithm, the relevant companion device 80 application will have been put into text input mode and will be ready to accept keyboard events (e.g. KEYUP and KEYDOWN).

Routine 285 (or equivalent) may be implemented in many ways. In the preferred embodiment, routine 285 will use three modules. A "classifier" module is used to map clusters in each frame to user fingers. A "tracker" module is used to track movement of active fingers by searching for a key stroke finger motion and by determining coordinates of the point of impact between the user's finger and a location on a virtual keyboard or other work surface. A third "mapper" module maps the impact point of a user finger to a specific key on the virtual keyboard and sends a key event to the companion device 80. These exemplary modules will now be described in further detail.

The role of the classifier module is to make sense of the contour map of the scene generated by sensor 20 at each frame of optically acquired data. The cluster module will identify clusters that have certain common properties such as being part of the same surface. Importantly, the classifier will label each cluster so that the same cluster can be identified from other clusters in successive frames of acquired data. The classifier also determines the boundaries of each cluster, and specifically determines the tip of each cluster, which tip maps to the tip of user fingers. The goal is not recognition of user fingers per se, in that for all intent and purpose the user could be holding a stick or stylus that is used to press virtual keys or virtual locations of keys. Thus the above-described template is used primarily to give meaning to these clusters and to assist in forming the clusters.

One method of clustering or locating clusters is to use a nearest neighbor condition to form nearest neighbor partitions, in which each partition maps to each finger of the user. Such mapping would result in five partitions for the user's left hand, and five partitions for the user's right hand, in which left hand and right hand partitions can be treated separately.

One method of partition formation is based on Llyod's algorithm. Details of this algorithm, which is well known in the field of image processing, may be found in the text *Vector Quantization and Signal Compression* by Allen Gersho and Robert Gray, see page 362. By way of example, let $C_t = \{c_i; i=1, \ldots 5\}$ be the set of partitions for one hand. In each partition a set of points $P_{i,t} = \{r: d(r, c_i) < d(r, c_j);$ for all $j <> i\}$ is defined, in which function $d(\ )$ is a measure of the distance between two points in the set. If $d(r, c_i) = d(r, c_j)$, the "tie" can be broken by placing the point in the set with a lower index. For two points a and b, $d(a,b)$ can be defined as $(x_a-x_b)^2+(y_a-y_b)^2+(z_a-z_b)^2$, where x, y and z are the axis-measurement sobtained from sensor 20. A function center($P_{i,t}$) can be defined as the center of gravity or centroid of the points in $P_{i,t}$. Next define $C_{t+1} = \{\text{center}(P_{i,t}); i=1, \ldots 5\}$. Using the new centroids, $P_{i,t+1}$ can be found, as above. Iteratation is continued (e.g., by routine 285 or equivalent) until the membership of the two successive $P_i$ sets remain unchanged. Typically, the iteration converges in 3–4 iterations, and points in the final set $P_i$ are the clusters of points for each user finger. In this method, the ultimate goal of the classifier is not recognition of user fingers per se, but rather to determine which key was struck by a user finger. This observation enables the classifier to tolerate clustering inaccuracies in the periphery of a typing region that do not impact the performance of the system.

The tracker module will now be more fully described with respect to the matrices shown in FIGS. 7A–7O, in which the clusters are shaded as an aide to visually understanding the data. Perceived clusters are preferably input to a tracker module that will keep track of the movement of each cluster. The tracker module is especially alert for relatively rapid up and down movements, and will compute velocities and directions of the clusters.

FIGS. 7D–7K depict matrix tables showing a sequence of images obtained as the user's second finger rises upward and then moves downward to strike at a (virtual) key beneath the end of the finger. Preferably the tip of each cluster that is closely monitored by the tracker module will have been identified by the classifier module. In actual images, other user fingers may also move slightly, but in the example being described, the classifier determines that the rate of acceleration of the left forefinger (finger 2) is noticeably higher than the movements of the other fingers.

Figures 7E, 7F, 7G:
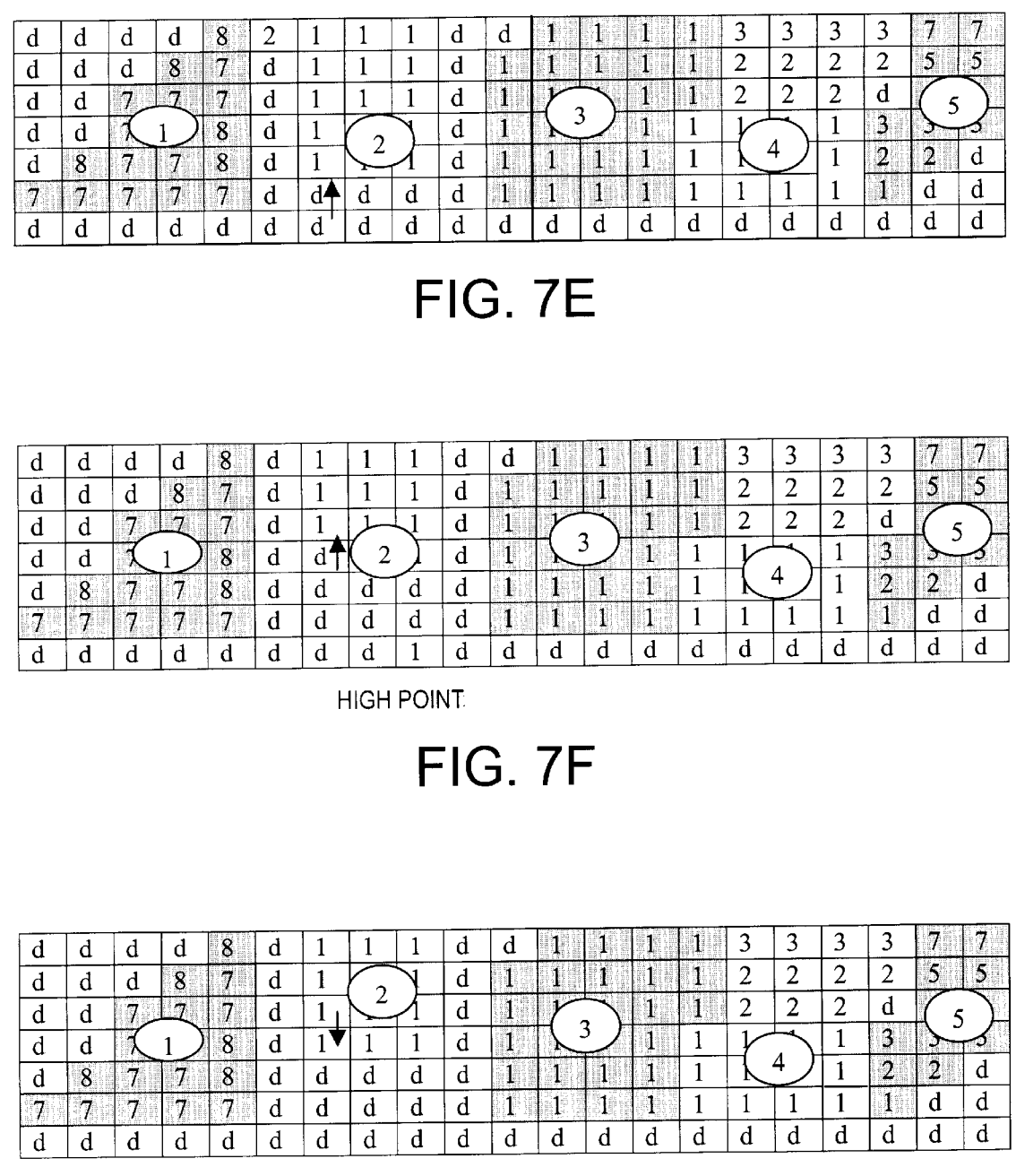
Figures 7H, 7I, 7J:
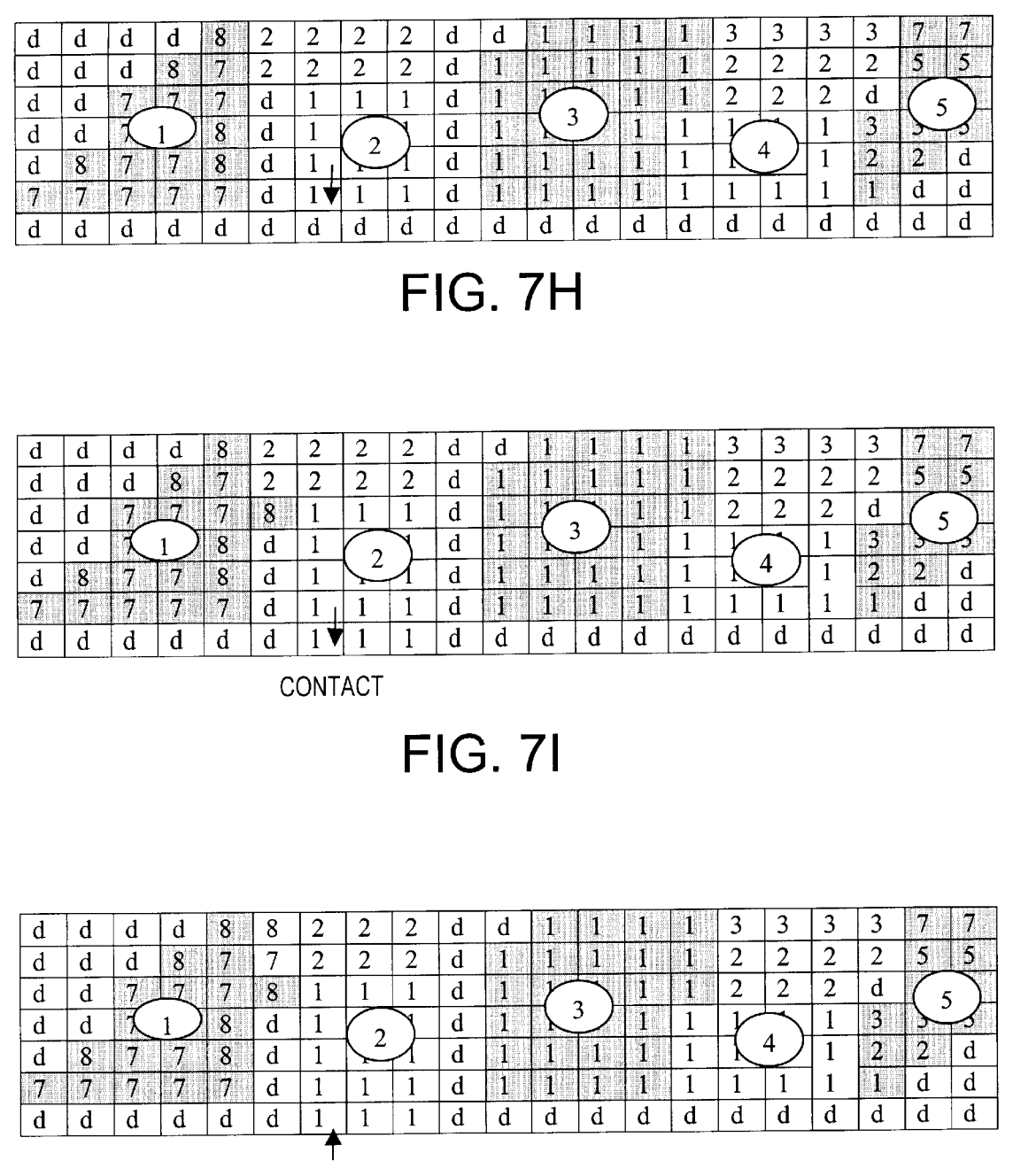
Figures 7K, 7L, 7M:
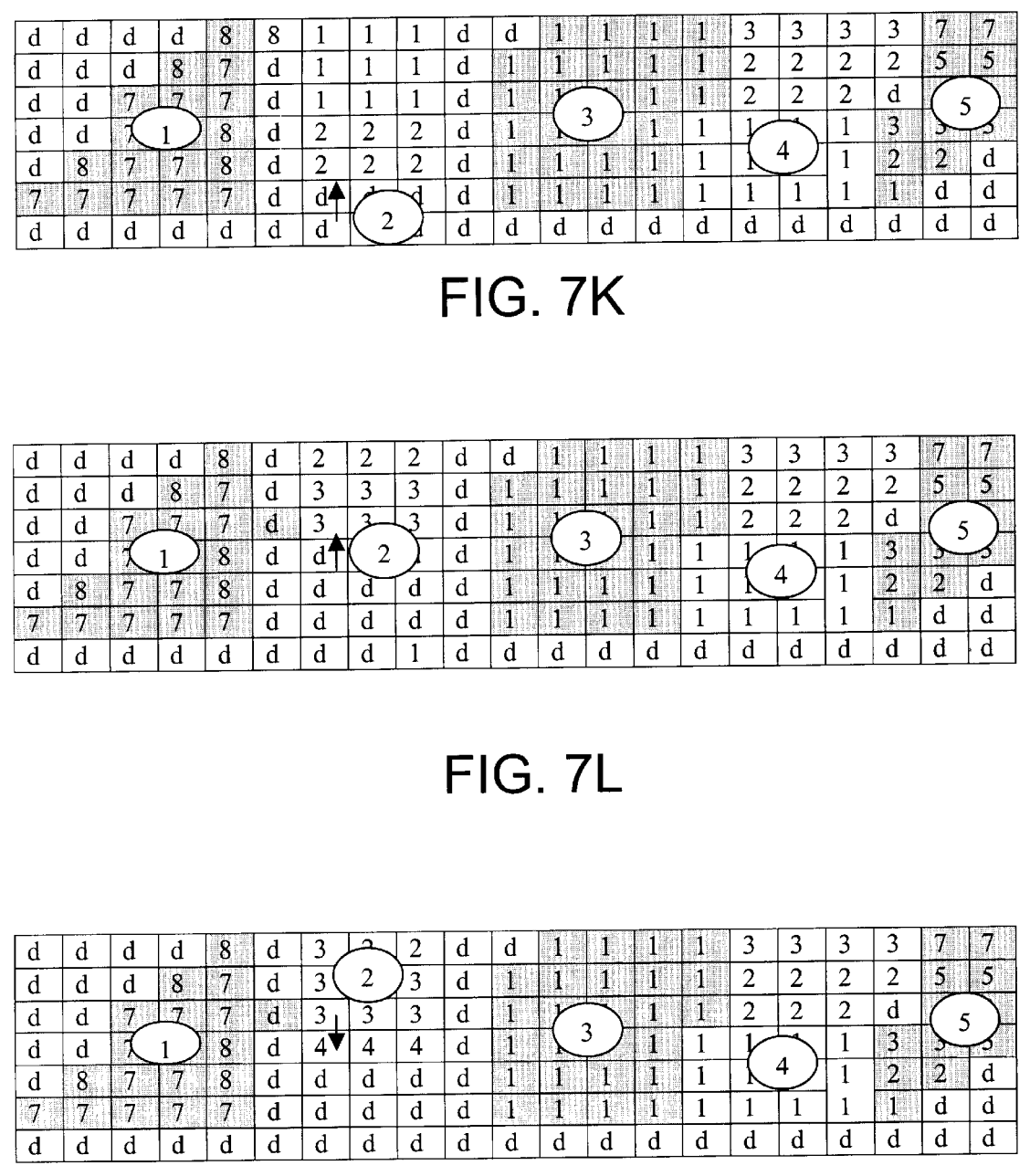

In FIGS. 7D–7E, a pointing arrow is added to show the direction and the tip of the perceived cluster (e.g., user finger). Cluster or finger movement is upward in FIGS. 7D–7F, with FIG. 7F representing a maximum upward position of the user's finger, e.g., a maximum Y-axis location as determined by sensor 20 acquired data. In FIGS. 7G–7H, the cluster or finger is now moving downward, e.g., toward the virtual keyboard 50 or work surface 60. In FIG. 7I, contact of the user's finger with a virtual key or key location on a work surface is perceived.

Vertical velocity of a finger tip may be computed by routine 285 (or other routine) in several ways. In a preferred embodiment, the tracker module computes vertical velocity of a user's fingertip (identified by the classifier) by dividing the difference between the highest and the lowest position of the fingertip by the number of frames acquired during the sequence: The velocity is computed in terms of Y-axis resolution by number of frames, which is independent of the frame rate per second. To register a key strike, this computed Y-axis velocity must be equal or higher than a threshold velocity. The threshold velocity is a parameter that used by software 285, and preferably is user-adjustable during the personalization step.

FIGS. 7J–7O depict matrix tables in which a more complex sequence showing movement of the user's left forefinger (finger 2) in a down-and-back direction. In FIG. 7O, this finger motion is shown culminating in a key stroke on a key in the first row of the virtual keyboard (or location on a work surface in front of device 80 where such virtual key would otherwise be found).

Referring now to the mapper module, the tracker module will signal the mapper module when it determines that a keystroke has been detected, and the tracker module passes the cluster tip (X,Y,Z) coordinates of the cluster tip. The mapper module uses the Z-axis value to determine the row location on the virtual keyboard, and uses the X-axis and Y-axis values to determine the key within the row. Referring for example to FIG. 1A, a coordinate (X,Y,Z) location (7,0,3) might signify the letter "T" on a virtual keyboard. Again it is understood that the various modules preferably comprise portions of software routine 285, although other routines including routines executed other than by CPU 285 may instead be used.

Modifications and variations may be made to the disclosed embodiments without departing from the subject and spirit of the invention as defined by the following claims. For example, if desired more than one sensor may be employed to acquire three-dimensional position information.

What is claimed is:

1. A method for a user to interact with a virtual input device using a user-controlled object, the method comprising the following steps:
   (a) acquiring data representing a single image at a given time from a single sensor system, from which data three-dimensional coordinate information of a relevant position of at least a portion of said user-controlled object may be determined such that a location defined on said virtual input device contacted by said user-controlled object is identifiable; and
   (b) processing data acquired at step (a) to determine, independently of velocity of said user-controlled object, whether a portion of said user-controlled object contacted a location defined on said virtual input device, and if contacted to determine what function of said virtual input device is associated with said location.

2. The method of claim 1, further including:
   (c) making available to a companion system information commensurate with contact location determined at step (b);
   wherein said user-controlled object interacts with said virtual input device to provide information to said companion system.

3. The method of claim 1, wherein at step (c), commensurate said information includes at least one information type selected from a group consisting of (i) a signal representing an alphanumeric character, (ii) a scan code representing an alphanumeric character, (iii) a signal representing a command, (iv) a digital code representing a command, (v) a signal representing at least one real-time locus of points representing movement of said user-controlled object, and (vi) a digital code representing at least one real-time locus of points representing movement of said user-controlled object.

4. The method of claim 2, wherein said companion system includes at least one device selected from a group consisting of (i) a PDA, (ii) a wireless telephone, (iii) a cellular telephone, (iv) a set-top box, (v) a mobile electronic device, (vi) an electronic device, (vii) a computer, (viii) an appliance adapted to accept input information, and (ix) an electronic system.

5. The method of claim 1, wherein step (a) includes providing a solid state sensor having an aspect ratio greater than about 2:1.

6. The method of claim 1, wherein at step (a), said data is acquired using time-of-flight from said single sensor system to a portion of said user-controlled object.

7. The method of claim 1, wherein said user-controlled object is selected from a group consisting of (i) a finger of said user, a (ii) a stylus, and (iii) an arbitrarily-shaped object.

8. The method of claim 1, wherein said virtual input device is defined on a work region selected from a group consisting of (i) three-dimensional space, (ii) a physical planar surface, (iii) a substrate, (iv) a substrate bearing a user-viewable image of an actual keyboard, (v) a substrate upon which is projected a user-viewable image of an actual keyboard, (vi) a substrate upon which is projected a user-viewable typing guide, (vii) a passive substrate bearing a user-viewable image of an actual keyboard and including passive key-like regions that provide tactile feedback when pressed by said user digit, (viii) a substrate that when deployed for use is larger than when not deployed for use, (ix) a substrate that when deployed for use measures at least 6"×12" but when not used measures less than about 6"×8", (x) a display screen, (xi) an electronic display screen, (xii) a LCD screen, (xiii) a CRT screen, and (xiv) a plasma screen.

9. The method of claim 1, further including providing said user with feedback guiding placement of said user-controlled object with respect to said virtual input device, said feedback including at least one type of feedback selected from a group consisting of (i) tactile feedback emulating user-typing upon an actual keyboard when said virtual input device is a virtual keyboard, (ii) audible feedback, (iii) a display of visual feedback representing an image of at least one keyboard key when said virtual input device is a virtual keyboard, (iv) a display of visual feedback representing an image including at least one keyboard key and at least a portion of said user-controlled object when said virtual input device is a virtual keyboard, (v) a display of visual feedback depicting keyboard keys wherein keys adjacent to said user-controlled object are visually distinguished from a key touched by said user-controlled object when said virtual input device is a virtual keyboard, (vi) a display of visual feedback representing information input by said user-controlled object, and (vii) a display of visual feedback representing an image whose position signifies position of said user-object relative to a virtual key when said virtual input device is a virtual keyboard, and wherein size of said image signifies distance from a lower surface of said user-object to said virtual keyboard.

10. The method of claim 1, wherein step (b) includes processing said information substantially in real-time.

11. The method of claim 1, wherein step (b) includes determining spatial location of a distal portion of said user-controlled object relative to location on said virtual input device using at least one of (i) three-dimensional location of said distal portion, (ii) velocity information for said distal portion in at least one direction, (iii) matching acquired information to template models of said user-controlled object, (iv) hysteresis information processing, (v) knowledge of language being input by said user, and (vi) dynamic configuration of said virtual input device as a function of time.

12. The method of claim 1, wherein:
   said virtual input device is a virtual keyboard with virtual keys; and
   step (b) includes:
      mapping three-dimensional positions of a distal tip portion of said user-controlled object to actual keys on an actual keyboard; and
      identifying which of said actual keys would have been typed upon by said user-controlled object were they present on said virtual input device.

13. The method of claim 1, wherein:
at step (a) said data is acquired in frames such that said three-dimensional coordinate information is obtainable from a single one of said frames.

14. The method of claim 1, wherein a user-viewable image of said virtual input device is projected upon a work region using at least one diffractive optical element.

15. The method of claim 1, wherein:
said virtual input device includes a virtual keyboard; and
said user-controlled object includes at least a portion of a hand of said user.

16. A method for a user to interact with a virtual input device, said device having at least one location with which a function is associated, using a user-controlled object, the method comprising the following steps:
(a) using a single sensor system to acquire data in frames representing a single image at a given time, from which data three-dimensional coordinate information of a relevant position of at least a portion of said user-controlled object may be derived with respect to said virtual input device; and
(b) processing information acquired at step (a) to determine whether a portion of said user-controlled object contacted a location defined on said virtual input device, and if contacted to determine what function of said virtual input device is associated with said location.

17. The method of claim 16, further including:
(c) making available to a companion system information commensurate with user-object contact location with said virtual input device determined at step (b);
wherein said user-controlled object interacts with said virtual input device to provide information to said companion system.

18. The method of claim 17, wherein said companion system includes at least one device selected from a group consisting of (I) a PDA, (ii) a wireless telephone, (iii) a cellular telephone, (iv) a set-top box, (v) a mobile electronic device, (vi) an electronic device, (vii) a computer, (viii) an appliance adapted to accept input information, and (ix) an electronic system.

19. The method of claim 16, wherein at step (a), said single sensor system includes at least a sensor array, and three-dimensional coordinate information is captured using time-of-flight from said sensor array to a surface portion of said user-controlled object.

20. The method of claim 16, wherein step (a) includes providing a solid state sensor having an aspect ratio greater than about 2:1.

21. The method of claim 16, wherein said user-controlled object is selected from a group consisting of (i) a finger of said user, a (ii) a stylus, and (iii) an arbitrarily-shaped object.

22. The method of claim 16, wherein said virtual input device is defined on a work region selected from a group consisting of (i) three-dimensional space, (ii) a physical planar surface, (iii) a substrate, (iv) a substrate bearing a user-viewable image of an actual keyboard, (v) a substrate upon which is projected a user-viewable image of an actual keyboard, (vi) a substrate upon which is projected a user-viewable typing guide, (vii) a passive substrate bearing a user-viewable image of an actual keyboard and including passive key-like regions that provide tactile feedback when pressed by said user digit, (viii) a substrate that when deployed for use is larger than when not deployed for use, (ix) a substrate that when deployed for use measures at least 6"×12" but when not used measures less than about 6"×8", (x) a display screen, (xi) an electronic display screen, (xii) a LCD screen, (xiii) a CRT screen, and (xiv) a plasma screen.

23. The method of claim 16, further including providing said user with feedback guiding placement of said user-controlled object with respect to said virtual input device, said feedback including at least one type of feedback selected from a group consisting of (I) tactile feedback emulating user-typing upon an actual keyboard when said virtual input device is a virtual keyboard, (ii) audible feedback, (iii) a display of visual feedback representing an image of at least one keyboard key when said virtual input device is a virtual keyboard, (iv) a display of visual feedback representing an image including at least one keyboard key and at least a portion of said user-controlled object when said virtual input device is a virtual keyboard, (v) a display of visual feedback depicting keyboard keys wherein keys adjacent to said user-controlled object are visually distinguished from a key touched by said user-controlled object when said virtual input device is a virtual keyboard, (vi) a display of visual feedback representing information input by said user-controlled object, and (vii) a display of visual feedback representing an image whose position signifies position of said user-object relative to a virtual key when said virtual input device is a virtual keyboard, and wherein size of said image signifies distance from a lower surface of said user-object to said virtual keyboard.

24. The method of claim 17, wherein at step (c), commensurate said information includes at least one information type selected from a group consisting of (i) a signal representing an alphanumeric character, (ii) a scan code representing an alphanumeric character, (iii) a signal representing a command, (iv) a digital code representing a command, (v) a signal representing at least one real-time locus of points representing movement of said user-controlled object, and (vi) a digital code representing at least one real-time locus of points representing movement of said user-controlled object.

25. The method of claim 16, wherein step (b) includes determining spatial location of a distal portion of said user-controlled object digit relative to location on said virtual input device using at least one of (i) three-dimensional location of said distal portion, (ii) velocity information for said distal portion in at least one direction, (iii) matching acquired information to template models of said user-controlled object, (iv) hysteresis information processing, (v) knowledge of language being input by said user, and (vi) dynamic configuration of said virtual input device as a function of time.

26. The method of claim 16, wherein:
said virtual input device is a virtual keyboard with virtual keys; and
step (b) includes:
mapping three-dimensional positions of a distal tip portion of said user-controlled object to actual keys on an actual keyboard; and
identifying which of said actual keys would have been typed upon by said user controlled object were they present on said virtual input device.

27. The method of claim 16, wherein:
step (b) includes processing said information substantially in real-time.

28. The method of claim 16, wherein:
said virtual input device includes a virtual keyboard; and
said user-controlled object includes at least a portion of a hand of said user.

29. A method for a user to interact with a virtual input device using a user-controlled object to input information to a companion system, said virtual input device having at least one location defined thereon with which a function is associated, the method comprising the following steps:

(a) using a single sensor system to acquire data representing a single image at a given time from which three-dimensional coordinate information may be determined as to relevant position of at least a portion of said user-controlled object such that a location defined on said virtual input device contacted by said user-controlled object is identifiable;

(b) processing data acquired at step (a) to determine whether a portion of said user-controlled object contacted a location defined on said virtual input device, and if contacted to determine what function of said virtual input device is associated with said location; and (c) coupling information processed at step (b) as input to said companion system.

30. The method of claim 29, wherein processing information at step (b) is carried out independently of velocity of said user-controlled object.

31. The method of claim 29, wherein at step (a), said positional co-ordinate information is captured using time-of-flight from said sensor system to a surface portion of said user-controlled object.

32. The method of claim 29, wherein step (a) includes providing a solid state sensor array having an aspect ratio greater than about 2:1.

33. The method of claim 29, wherein said user-controlled object is selected from a group consisting of (i) a finger of said user, a (ii) a stylus, and (iii) an arbitrarily-shaped object.

34. The method of claim 29, wherein said virtual input device is defined on a work region selected from a group consisting of (i) three-dimensional space, (ii) a physical planar surface, (iii) a substrate, (iv) a substrate bearing a user-viewable image of an actual keyboard, (v) a substrate upon which is projected a user-viewable image of an actual keyboard, (vi) a substrate upon which is projected a user-viewable typing guide, (vii) a passive substrate bearing a user-viewable image of an actual keyboard and including passive key-like regions that provide tactile feedback when pressed by said user digit, (viii) a substrate that when deployed for use is larger than when not deployed for use, (ix) a substrate that when deployed for use measures at least 6"×12" but when not used measures less than about 6"×8", (x) a display screen, (xi) an electronic display screen, (xii) a LCD screen, (xiii) a CRT screen, and (xiv) a plasma screen.

35. The method of claim 29, further including providing said user with feedback guiding placement of said user-controlled object with respect to said virtual input device, said feedback including at least one type of feedback selected from a group consisting of (I) tactile feedback emulating user-typing upon an actual keyboard when said virtual input device is a virtual keyboard, (ii) audible feedback, (iii) a display of visual feedback representing an image of at least one keyboard key when said virtual input device is a virtual keyboard, (iv) a display of visual feedback representing an image including at least one keyboard key and at least a portion of said user-controlled object when said virtual input device is a virtual keyboard, (v) a display of visual feedback depicting keyboard keys wherein keys adjacent to said user-controlled object are visually distinguished from a key touched by said user-controlled object when said virtual input device is a virtual keyboard, (vi) a display of visual feedback representing information input by said user-controlled object, and (vii) a display of visual feedback representing an image whose position signifies position of said user-object relative to a virtual key when said virtual input device is a virtual keyboard, and wherein size of said image signifies distance from a lower surface of said user-object to said virtual keyboard.

36. The method of claim 29, wherein at step (c), said information includes at least one information type selected from a group consisting of (i) a signal representing an alphanumeric character, (ii) a scan code representing an alphanumeric character, (iii) a signal representing a command, (iv) a digital code representing a command, (v) a signal representing at least one real-time locus of points representing movement of said user-controlled object, and (vi) a digital code representing at least one real-time locus of points representing movement of said user-controlled object.

37. The method of claim 29, wherein step (b) includes determining spatial location of a distal portion of said user-controlled object digit relative to location on said virtual input device using at least one of (i) three-dimensional location of said distal portion, (ii) velocity information for said distal portion in at least one direction, (iii) matching acquired information to template models of said user-controlled object, (iv) hysteresis information processing, (v) knowledge of language being input by said user, and (vi) dynamic configuration of said virtual input device as a function of time.

38. The method of claim 29, wherein:
said virtual input device is a virtual keyboard with virtual keys; and
step (b) includes:
mapping coordinate positions of a distal tip portion of said user-controlled object to on an actual keyboard; and
identifying which of said actual keys would have been typed upon by said user-controlled object were they present on said virtual input device.

39. The method of claim 29, wherein:
at step (a) said data is acquired in frames such that said positional coordinate information is obtainable from a single one of said frames.

40. The method of claim 29, wherein said companion system includes at least one device selected from a group consisting of (i) a PDA, (ii) a wireless telephone, (iii) a cellular telephone, (iv) a set-top box, (v) a mobile electronic device, (vi) an electronic device, (vii) a computer, (viii) an appliance adapted to accept input information, and (ix) an electronic system.

41. The method of claim 29, wherein a user-viewable image of said virtual input device is projected upon a work region using at least one diffractive optical element.

42. The method of claim 29, wherein:
said virtual input device is a computer mouse; and
step (b) includes mapping real-time locus points representing movement of at least one user-controlled object to movement events of an actual computer mouse.

43. The method of claim 29, wherein:
said virtual input device is a trackball device; and
further including mapping successive three-dimensional coordinate position information of a distal tip portion of said user-controlled object to a trackball and identifying how much trackball rotation would have occurred were an actual trackball present.

44. The method of claim 29, wherein:
said virtual input device includes a virtual keyboard; and
said user-controlled object includes at least a portion of a hand of said user.

45. A system that enables a user to interact with a virtual input device using a user-controlled object, the system comprising:

a single sensor system to capture data in frames representing a single image at a given time from which three-dimensional coordinate information of a relevant position of at least a portion of said user-controlled object may be derived from one of (a) a single data frame or (b) multiple data frames captured at substantially the same time with respect to said virtual input device such that a location defined on said virtual input device contacted by said user-controlled object is identifiable;

a processor, coupled to said single sensor system, to process single sensor system-captured data, to determine whether a portion of said user-controlled object contacted a location defined on said virtual input device, and if contacted to determine what function of said virtual input device is associated with said location.

46. The system of claim 45, further including means for outputting to a companion device function information determined by said processor from user-controlled object contact with said virtual input device.

47. The system of claim 45, herein said companion device includes at least one device selected from a group consisting of (i) a PDA, (ii) a wireless telephone, (iii) a cellular telephone, (iv) a set-top box, (v) a mobile electronic device, (vi) an electronic device, (vii) a computer, (viii) an appliance adapted to accept input information, and (ix) an electronic system.

48. The system of claim 45, wherein said system has at least one characteristic selected from a group consisting of (i) an effective aspect ratio greater than about 2:1, and (ii) said data is acquired using time-of-flight from said single sensor to said user-controlled object.

49. The system of claim 45, wherein said user-controlled object is selected from a group consisting of (i) a finger of said user, a (ii) a stylus, and (iii) an arbitrarily-shaped object.

50. The system of claim 45, wherein said virtual input device is defined on a work region selected from a group consisting of (i) three-dimensional space, (ii) a physical planar surface, (iii) a substrate, (iv) a substrate bearing a user-viewable image of an actual keyboard, (v) a substrate upon which is projected a user-viewable image of an actual keyboard, (vi) a substrate upon which is projected a user-viewable typing guide, (vii) a passive substrate bearing a user-viewable image of an actual keyboard and including passive key-like regions that provide tactile feedback when pressed by said user digit, (viii) a substrate that when deployed for use is larger than when not deployed for use, (ix) a substrate that when deployed for use measures at least 6"×12" but when not used measures less than about 6"×8", (x) a display screen, (xi) an electronic display screen, (xii) a LCD screen, (xiii) a CRT screen, and (xiv) a plasma screen.

51. The system of claim 45, wherein said processor determines substantially in real-time.

52. The system of claim 45, further including means for providing said user with feedback guiding placement of said user-controlled object, said feedback including at least one type of feedback selected from a group consisting of (i) tactile feedback emulating user-typing upon an actual keyboard when said virtual input device is a virtual keyboard, (ii) audible feedback, (iii) a display of visual feedback representing an image of at least one keyboard key when said virtual input device is a virtual keyboard, (iv) a display of visual feedback representing an image including at least one keyboard key and at least a portion of said user-controlled object when said virtual input device is a virtual keyboard, (v) a display of visual feedback depicting keyboard keys wherein keys adjacent to said user-controlled object are visually distinguished from a key touched by said user-controlled object when said virtual input device is a virtual keyboard, (vi) a display of visual feedback representing information input by said user-controlled object, and (vii) a display of visual feedback representing an image whose position signifies position of said user-object relative to a virtual key when said virtual input device is a keyboard and whose image size signifies distance from a lower surface of said user-object to said keyboard.

53. The system of claim 45, wherein function information of said virtual input device is associated with said location includes at least one type of information selected from a group consisting of (i) a signal representing an alphanumeric character, (ii) a scan code representing an alphanumeric character, (iii) a signal representing a command, (iv) a digital code representing a command, (v) a signal representing at least one real-time locus of points representing movement of said user-controlled object and (vi) a digital code representing at least one real-time locus of points representing movement of said user-controlled object.

54. The system of claim 45, wherein said processor determine spatial location of a distal portion of said user-controlled object digit relative to location on said virtual input device using at least one of (i) three-dimensional location of said distal portion, (ii) velocity information for said distal portion in at least one direction, (iii) matching acquired information to template models of said user-controlled object, (iv) hysteresis information processing, (v) knowledge of language being input by said user, and (vi) dynamic configuration of said virtual input device as a function of time.

55. The system of claim 45, wherein:
said virtual input device is a virtual keyboard having virtual keys, and further including:
means for mapping positional coordinate positions of a distal tip portion of said user-controlled object to actual keys on an actual keyboard; and
identifying which of said actual keys would have been typed upon by said user-controlled object were they present on said virtual input device.

56. The system of claim 45, further including a sub-system to project a user-viewable image of said virtual input device upon a work region, said sub-system including at least one diffractive optical element.

57. The system of claim 45, wherein:
said virtual input device includes a virtual keyboard; and
said user-controlled object includes at least a portion of a hand of said user.

58. A system that enables a user to interact with a virtual input device using a user-controlled object, the system comprising:
a single sensor system to capture data representing a single image at a given time from which three-dimensional coordinate information of a relevant position of at least a portion of said user-controlled object may be derived such that a location defined on said virtual input device contacted by said user-controlled object is identifiable;

a processor, coupled to said sensor, to process single sensor system-captured data, to determine without having to calculate velocity of said user-object relative to said virtual input device whether a portion of said user-controlled object contacted a location defined on said virtual input device, and if contacted to determine what function of said virtual input device is associated with said location.

59. The system of claim 58, further including means for outputting to a companion device function information determined by said processor.

60. The system of claim 58, wherein said companion device includes at least one device selected from a group consisting of (i) a PDA, (ii) a wireless telephone, (iii) a cellular telephone, (iv) a set-top box, (v) a mobile electronic device, (vi) an electronic device, (vii) a computer, (viii) an appliance adapted to accept input information, and (ix) an electronic system.

61. The system of claim 58, wherein said system has at least one characteristic selected from a group consisting of (I) an effective aspect ratio greater than about 2:1, and (ii) said data is acquired using time-of-flight from single sensor system to a portion of said user-controlled object.

62. The system of claim 58, wherein said user-controlled object is selected from a group consisting of (i) a finger of said user, a (ii) a stylus, and (iii) an arbitrarily-shaped object.

63. The system of claim 58, wherein said virtual input device is defined on a work, region selected from a group consisting of (i) three-dimensional space, (ii) a physical planar surface, (iii) a substrate, (iv) a substrate bearing a user-viewable image of an actual keyboard, (v) a substrate upon which is projected a user-viewable image of an actual keyboard, (vi) a substrate upon which is projected a user-viewable typing guide, (vii) a passive substrate bearing a user-viewable image of an actual keyboard and including passive key-like regions that provide tactile feedback when pressed by said user digit, (viii) a substrate that when deployed for use is larger than when not deployed for use, (ix) a substrate that when deployed for use measures at least 6"×12" but when not used measures less than about 8"×8", (x) a display screen, (xi) an electronic display screen, (xii) a LCD screen, (xiii) a CRT screen, and (xiv) a plasma screen.

64. The system of claim 58, wherein said processor determines substantially in real-time.

65. The system of claim 58, further including means for providing said user with feedback guiding placement of said user-controlled object, said feedback including at least one type of feedback selected from a group consisting of (i) tactile feedback emulating user-typing upon an actual keyboard when said virtual input device is a keyboard, (ii) audible feedback, (iii) a display of visual feedback representing an image of at least one keyboard key when said virtual input device is a keyboard, (iv) a display of visual feedback representing an image including at least one keyboard key and at least a portion of said user-controlled object when said virtual input device is a keyboard, (v) a display of visual feedback depicting keyboard keys wherein keys adjacent to said user-controlled object are visually distinguished from a key touched by said user-controlled object when said virtual input device is a keyboard, and (vi) a display of visual feedback representing information input by said user-controlled object.

66. The system of claim 58, wherein function information of said virtual input device is associated with said location includes at least one type of information selected from a group consisting of (i) a signal representing an alphanumeric character, (ii) a scan code representing an alphanumeric character, (iii) a signal representing a command, (iv) a digital code representing a command, (v) a signal representing at least one real-time locus of points representing movement of said user-controlled object, and (vi) a digital code representing at least one real-time locus of points representing movement of said user-controlled object.

67. The system of claim 58, wherein said processor determine spatial location of a distal portion of said user-controlled object digit relative to location on said virtual input device using at least one of (i) three-dimensional location of said distal portion, (ii) velocity information for said distal portion in at least one direction, (iii) matching acquired information to template models of said user-controlled object, (iv) hysteresis information processing, (v) knowledge of language being input by said user, and (vi) dynamic configuration of said virtual input device as a function of time.

68. The system of claim 58, wherein:
said virtual input device is a virtual keyboard with virtual keys; and further including:
means for mapping positional coordinate positions of a distal tip portion of said user-controlled object to actual keys on an actual keyboard; and
identifying which of said actual keys would have been typed upon by said user-controlled object were they present on said virtual input device.

69. The system of claim 58, further including a sub-system to project a user-viewable image of said virtual input device upon a work region, said sub-system including at least one diffractive optical element.

70. The system of claim 58, wherein:
said virtual input device includes a virtual keyboard; and
said user-controlled object includes at least a portion of a hand of said user.

71. A method of determining interaction between a user-controlled object and a virtual input device, the method comprising the following steps:
(a) defining a plurality of identifiable locations on said virtual input device;
(b) sensing with a single sensor system that acquires data representing a single image at a given time three-dimensional positional coordinate information to detect contact between at least a portion of said user-controlled object and at least one of said identifiable locations defined on said virtual input device; and
(c) determining an input function, associated with said virtual input device, assigned to at least one location sensed at step (b) of detected contact by said user-controlled object.

72. The method of claim 71, wherein:
said virtual input device includes a virtual keyboard; and
said user-controlled object includes at least a portion of a hand of said user.

73. A method of determining interaction between a user-controlled object and a virtual input device, the method comprising the following steps:
(a) defining a plurality of identifiable locations on said virtual input device;
(b) sensing with a single sensor system that acquires a single image at a given time three-dimensional coordinate information to detect contact between said user-controlled object and at least one of said plurality of identifiable positions; and
(c) determining an input function assigned to at least one of said identifiable positions sensed at step (b).

74. The method of claim 73, wherein:
step (b) includes sensing position coordinate information as said user-controlled object is moved across a series of said identifiable locations.

75. The method of claim 73, wherein:
step (b) includes sensing position coordinate information as said user-controlled object is moved across a series of said identifiable locations; and step (c) includes determining an input function assigned to at least a last identifiable location in said series of said identifiable locations.

76. The method of claim 75, wherein:

step (b) includes sensing position coordinate information as said user-controlled object is moved across a series of said identifiable locations defined on a common plane.

77. The method of claim 75, wherein:

step (b) includes sensing positional coordinate information to detect movement of said user-controlled object along a plane and across at least one of said plurality of identifiable locations.

78. The method of claim 73, wherein:

step (b) includes sensing position coordinate information as said user-controlled object is moved across a series of said identifiable locations; and step (c) includes determining an input function assigned to at least a first said identifiable location and a last said identifiable location in said series of identifiable locations.

79. The method of claim 73, wherein:

said virtual input device includes a virtual keyboard; and said user-controlled object includes at least a portion of a hand of said user.

80. A system enabling a user to interact with a virtual keyboard using a user-controlled object to input information to a companion system, said virtual keyboard defining at least two virtual key locations, each of said virtual key locations having an associated function, the system comprising:

a diffractive projection sub-system to project a user-viewable image of said virtual keyboard, said sub-system including at least one diffractive optical element;

a single sensor system to acquire data representing a single image at a given time from which three-dimensional coordinate information may be determined as to relevant position of at least a portion of said user-controlled object with respect to said virtual keyboard such that identification of a virtual key location contacted by said user-controlled object is identifiable;

means for processing information acquired from said single sensor system to determine whether a portion of said user-controlled object contacted a virtual key location, and if contacted to determine what function of said virtual keyboard is associated with said location; and means for coupling information so processed to said companion system.

81. The system of claim 80, wherein:

said user-controlled object includes at least a portion of a hand of said user.

82. A system enabling a user to interact with a virtual mouse using a user-controlled object to input information to a companion system, the system comprising:

a diffractive projection sub-system to project a user-viewable image of said virtual mouse, said sub-system including at least one diffractive optical element;

a single sensor system to acquire data representing a single image at a given time from which three-dimensional coordinate information may be determined as to relevant position of at least a portion of said user-controlled object so as to map real-time locus points representing movement of said user-controlled object to movement events of an actual mouse;

means for processing information acquired from said single sensor system to determine whether a portion of said user-controlled object contacted said virtual mouse, and if contacted to determine relative movement and associated function of an actual mouse; and means for coupling information so processed to said companion system.

* * * * *

UNITED STATES PATENT AND TRADEMARK OFFICE
CERTIFICATE OF CORRECTION

PATENT NO. : 6,614,422 B1  Page 1 of 1
APPLICATION NO. : 09/502499
DATED : September 2, 2003
INVENTOR(S) : Cyrus Bamji et al.

It is certified that error appears in the above-identified patent and that said Letters Patent is hereby corrected as shown below:

In claim 3, col. 23, line 45, replace "claim 1" with --claim 2--.

In claim 3, col. 23, lines 45-46, replace "commensurate said information" with --said commensurate information--.

In claim 9, col. 24, line 21, delete "including" following "claim 1, further".

In claim 53, col. 30, line 13, delete "is" following "virtual input device".

In claim 54, col. 30, line 24, replace "determine spacial location" with --determines spacial location--.

In claim 58, col. 30, line 62, replace "coupled to said sensor to" with --coupled to said single sensor system to--.

In claim 63, col. 31, line 30, replace "pressed by said user digit," with --pressed by said user,--.

Signed and Sealed this

Sixth Day of February, 2007

JON W. DUDAS
*Director of the United States Patent and Trademark Office*